United States Patent
Lim et al.

(10) Patent No.: US 10,629,998 B2
(45) Date of Patent: Apr. 21, 2020

(54) RADAR APPARATUS AND ERROR CORRECTION METHOD THEREOF

(71) Applicant: Mando Corporation, Pyeongtaek-si, Gyeonggi-do (KR)

(72) Inventors: Hae Sueng Lim, Yongin-si (KR); Jae Eun Lee, Seoul (KR); Seong Hee Jeong, Yongin-si (KR)

(73) Assignee: MANDO CORPORTION, Pyeongtaek-si, Gyeonggi-Do (KR)

( * ) Notice: Subject to any disclaimer, the term of this patent is extended or adjusted under 35 U.S.C. 154(b) by 317 days.

(21) Appl. No.: 15/821,114

(22) Filed: Nov. 22, 2017

(65) Prior Publication Data
US 2018/0151958 A1    May 31, 2018

(30) Foreign Application Priority Data
Nov. 28, 2016   (KR) .......................... 10-2016-0159735

(51) Int. Cl.
  *H01Q 17/00*    (2006.01)
  *H01Q 21/06*    (2006.01)
  (Continued)

(52) U.S. Cl.
  CPC ......... *H01Q 17/001* (2013.01); *G01S 7/4815* (2013.01); *G01S 13/931* (2013.01);
  (Continued)

(58) Field of Classification Search
  None
  See application file for complete search history.

(56) References Cited

U.S. PATENT DOCUMENTS

| 8,559,571 | B2 * | 10/2013 | Tung | H04B 7/0413 |
| | | | | 375/346 |
| 9,322,864 | B2 * | 4/2016 | Foegelle | G01R 29/105 |

(Continued)

OTHER PUBLICATIONS

J. Guetlein et al., "Calibration Strategy for a TDM FMCW MIMO Radar System"; published in the Proceedings of the 2013 IEEE International Conference on Microwaves, Communications, Antennas and Electronic Systems; Tel Aviv, Israel; Oct. 21-23, 2013. IEEE, Piscataway, NJ, USA. (Year: 2013).*

N. Zhang et al., "Identifiability Analysis for Array Shape Self-Calibration in MIMO Radar"; published in the Proceedings of the 2014 IEEE Radar Conference; May 19, 2014; pp. 1108-1113; IEEE, Piscataway, NJ, USA. (Year: 2014).*

*Primary Examiner* — Bernarr E Gregory
(74) *Attorney, Agent, or Firm* — Hauptman Ham, LLP

(57) ABSTRACT

The present disclosure provides a radar apparatus and a method of correcting an error of the radar apparatus. According to the present disclosure a first transmitting antenna group and a first receiving antenna group are constituted by elongating some of a plurality of transmitting antennas and a plurality of receiving antennas in a first direction of vertical directions, a second transmitting antenna group and a second receiving antenna group are constituted by elongating the other antennas in a second direction opposite to the first direction, and one or more of transmitting antennas that transmit transmission signals and one or more of receiving antennas that receive reflection signals are included in different groups, thereby being able to measure elevation information of an object and correct a mounting position of the radar apparatus on the basis of the information.

17 Claims, 17 Drawing Sheets

(51) Int. Cl.
| | |
|---|---|
| *H01Q 21/00* | (2006.01) |
| *H01Q 21/08* | (2006.01) |
| *H01Q 3/24* | (2006.01) |
| *H01Q 1/32* | (2006.01) |
| *G01S 13/93* | (2020.01) |
| *G01S 7/481* | (2006.01) |
| *G01S 7/40* | (2006.01) |
| *G01S 13/931* | (2020.01) |
| *G01S 13/00* | (2006.01) |

(52) U.S. Cl.
CPC ......... *H01Q 1/3216* (2013.01); *H01Q 1/3283* (2013.01); *H01Q 3/24* (2013.01); *H01Q 21/0006* (2013.01); *H01Q 21/0075* (2013.01); *H01Q 21/065* (2013.01); *H01Q 21/08* (2013.01); *G01S 2013/9371* (2013.01); *G01S 2013/9375* (2013.01); *G01S 2013/9389* (2013.01)

(56) References Cited

U.S. PATENT DOCUMENTS

| | | | | |
|---|---|---|---|---|
| 9,823,337 | B2* | 11/2017 | Heo | G01S 7/4026 |
| 10,126,410 | B2* | 11/2018 | Treptow | G01S 7/4026 |
| 10,379,204 | B2* | 8/2019 | Loesch | G01S 7/4026 |
| 2013/0016003 | A1* | 1/2013 | Stirling-Gallacher | G01S 7/4026 342/174 |
| 2014/0104097 | A1* | 4/2014 | Binzer | G01S 13/931 342/74 |
| 2015/0253420 | A1* | 9/2015 | Alland | G01S 13/931 342/156 |
| 2016/0033632 | A1* | 2/2016 | Searcy | G01S 13/931 342/153 |
| 2018/0306902 | A1* | 10/2018 | Pernst | G01S 7/40 |

* cited by examiner

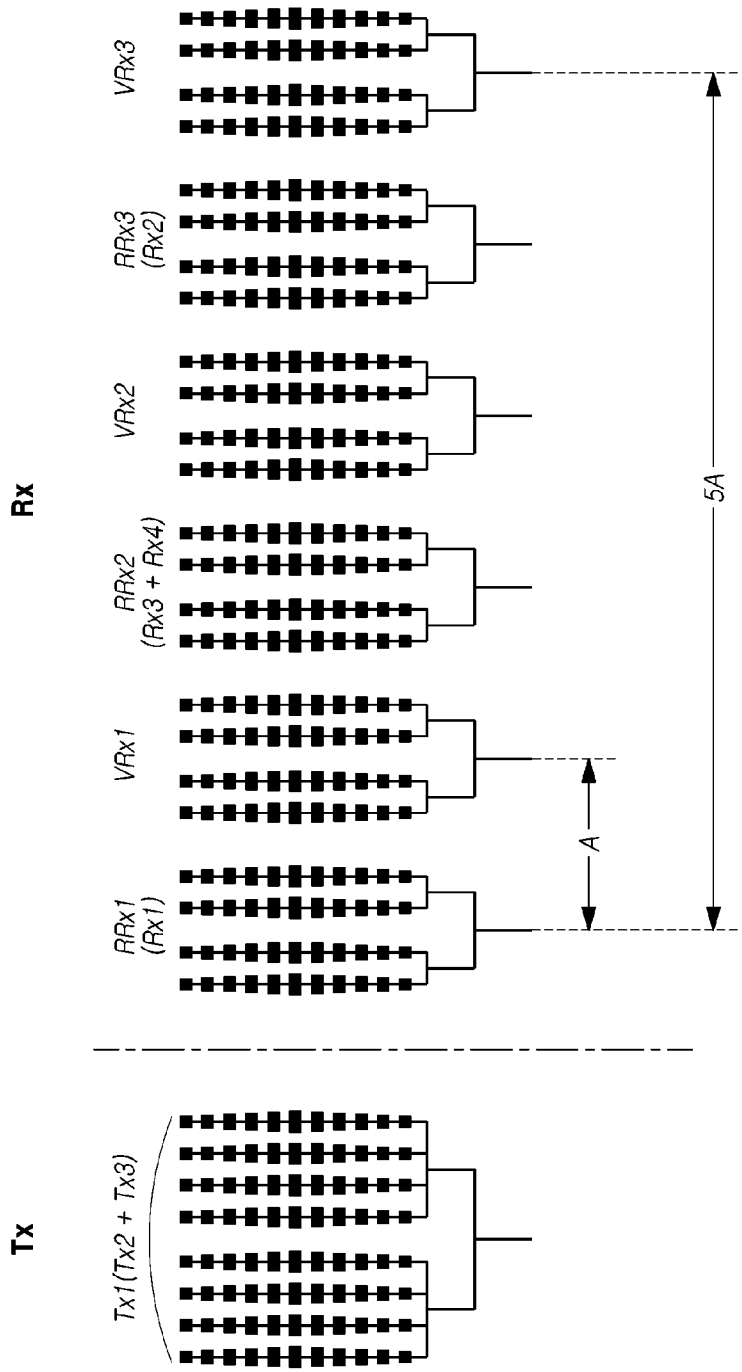

RADAR APPARATUS AND ERROR CORRECTION METHOD THEREOF

CROSS REFERENCE TO RELATED APPLICATION

This application claims priority from Korean Patent Application No. 10-2016-0159735, filed on Nov. 28, 2016, which is hereby incorporated by reference for all purposes as if fully set forth herein.

BACKGROUND OF THE INVENTION

1. Field of the Invention

The present disclosure relates to a radar apparatus and a method of correcting an error of the radar apparatus. More particularly, the present disclosure relates to a radar apparatus and a method of correcting an error of the radar apparatus, the method being able to correct an error when an installation position error is generated in a radar apparatus including a multi-input multi-output (hereafter, referred to as 'MIMO') antenna.

2. Description of the Prior Art

A radar apparatus for vehicles etc. should have high resolution and angular resolving power. For example, automotive radars for preventing a front collision can determine interruption by extracting an angle in in-path cut-in and cut-out of a vehicle running ahead in adjacent lines. That is, it is possible to secure safety for a driver by reducing mis-sensing of a target and estimating a collision situation in cut-in and cut-out using the high resolution and angular resolving power.

Further, automotive radars require a mid/long-range sensing function for sensing objects at long distances in a relatively small angular range and a short-range sensing function for sensing objects at short distances within a relatively large angle range, using one antenna system.

Further, existing radar apparatuses include arrangement of a plurality of receiving antennas to obtain high angular resolving power. That is, radar apparatuses of the related art use a structure that increases angular resolving power by arranging receiving antennas in a plurality of channels.

Radar apparatuses having a structure including arrangement of a plurality of receiving antennas in the related art are structurally large in size due to the antennas and require many elements related to a transceiver (that is, an RF circuit), so the size of the entire antenna system is increased.

However, at present, the portion of vehicles where a radar apparatus can be mounted is limited due to an ultrasonic sensor in the bumper, the license plate, the fog lamps, and various structures such as support structures, so radar apparatuses are unavoidably limited in size.

Recently, a MIMO radar has been developed to reduce the size of automotive radars.

A MIMO radar has an effect of expanding an aperture of a receiving antenna by arranging transmitting antennas with an appropriate gap, so it has been recently actively researched in terms of being able to reduce the number of RF chips and without reducing performance.

Existing MIMO radars developed for a vehicle provide an efficient aperture expansion effect by usually arranging two transmitting channels and a several receiving channels, and this structure has been proposed for long-range radars or mid-range radars of automotive radars.

Meanwhile, when a vehicle is equipped with a MIMO radar, it is required to precisely set the vertical and horizontal mounting positions of the radar, but the radar may come out of a normal mounting position due to an error when it is mounted on the vehicle or due to external shock while it is used after being mounted.

When such a mounting position error is generated, the sensing performance of the radar may be deteriorated, so the error should be corrected.

SUMMARY OF THE INVENTION

For this background, an object of the present disclosure is to provide a radar apparatus of which the performance can be maximized up to not only mid/long-range performance, but short-range performance by efficiently arranging a plurality of transmitting antennas and a plurality of receiving antennas.

Another object of the present disclosure is to provide a radar apparatus and a method of correcting a vertical mounting error of the radar apparatus, which includes an antenna system including a plurality of transmitting antennas and a plurality of receiving antenna and being able to perform multi-input multi-output (MIMO), by measuring elevation information of an error correction target and then correcting the vertical mounting error of the radar apparatus on the basis of the measurement values.

Another object of the present disclosure is to provide a radar apparatus and a method of correcting an error of the radar apparatus, in which a first transmitting antenna group and a first receiving antenna group are constituted by elongating some of a plurality of transmitting antennas and a plurality of receiving antennas in a first direction of vertical directions, a second transmitting antenna group and a second receiving antenna group are constituted by elongating the other antennas in a second direction opposite to the first direction, and one or more of transmitting antennas that transmit transmission signals and one or more of receiving antennas that receive reflection signals are included in different groups, thereby being able to measure elevation information of a target and correct a mounting position of the radar apparatus on the basis of the information.

In accordance with an aspect of the present disclosure, there is provided a radar apparatus, the radar apparatus including: a transmitting antenna set configured to include a first transmitting antenna group including a first transmitting antenna elongated in a first direction of vertical directions, and a second transmitting antenna group including a second transmitting antenna and a third transmitting antenna that are elongated in a second direction opposite to the first direction and spaced from the first transmitting antenna by a first vertical distance; a receiving antenna set configured to include a first receiving antenna group including a first receiving antenna and a second receiving antenna that elongated in the first direction, and a second receiving antenna group including a third receiving antenna and a fourth receiving antenna that are elongated in the second direction and spaced from the first receiving antenna group by a second vertical distance; a transceiver configured to transmit transmission signals through the transmitting antenna set and receive reflection signals reflected from an error correction target through the receiving antenna set; a processor configured to obtain elevation information of the target on the basis of the reflection signals received by the receiving antenna set; and an error corrector configured to calculate a difference between measurement values of the elevation information of the target obtained by the processor and actual elevation information of the target, and change the direction of beam-forming of the receiving antennas included in the receiving antenna set in accordance with the difference.

In accordance with an aspect of the present disclosure, there is provided a method of correcting an error of a radar apparatus that includes: an antenna system configured to include a transmitting antenna set including a first transmitting antenna group including a first transmitting antenna elongated in a first direction of vertical directions, and a second transmitting antenna group including a second transmitting antenna and a third transmitting antenna that are elongated in a second direction opposite to the first direction and spaced from the first transmitting antenna by a first vertical distance; and a receiving antenna set including a first receiving antenna group including a first receiving antenna and a second receiving antenna that are elongated in the first direction, and a second receiving antenna group including a third receiving antenna and a fourth receiving antenna that are elongated in the second direction and spaced from the first receiving antenna group by a second vertical distance; a transceiver; a processor; and an error corrector. The method includes: checking a vertical mounting error on the basis of a difference between measurement values of the elevation information of the target obtained by the processor and actual elevation information of the target; and correcting an error by adjusting beam-forming directions of the receiving antennas included in the receiving antenna set in accordance with the difference.

As described above, according to an embodiment of the present disclosure, by using a radar apparatus that includes an antenna system including a plurality of transmitting antenna and a plurality of receiving antenna and being able to perform multi-input multi-output (MIMO), it is possible to precisely measure elevation information of an error correction target and then correct a vertical mounting error of the radar apparatus on the basis of the measurement values.

In detail, a first transmitting antenna group and a first receiving antenna group are constituted by elongating some of a plurality of transmitting antennas and a plurality of receiving antennas in a first direction of vertical directions, a second transmitting antenna group and a second receiving antenna group are constituted by elongating the other antennas in a second direction opposite to the first direction, and one or more of transmitting antennas that transmit transmission signals and one or more of receiving antennas that receive reflection signals are included in different groups, thereby being able to precisely measure elevation information of a target and correct a mounting position of the radar apparatus by performing digital beam-forming on reception beams of the receiving antennas in accordance with the difference between the measured elevation information of the target and the actual elevation information of the target.

BRIEF DESCRIPTION OF THE DRAWINGS

FIGS. 5A and 5B show a case for sensing azimuth information using a radar apparatus according to the present disclosure, particularly, in which timing diagram of signals in a mid/long-range sensing mode (FIG. 5a) and an equivalent state diagram of transmitting and receiving antennas in this case (FIG. 5b) are provided.

DETAILED DESCRIPTION OF THE EXEMPLARY EMBODIMENTS

Figure 1A:
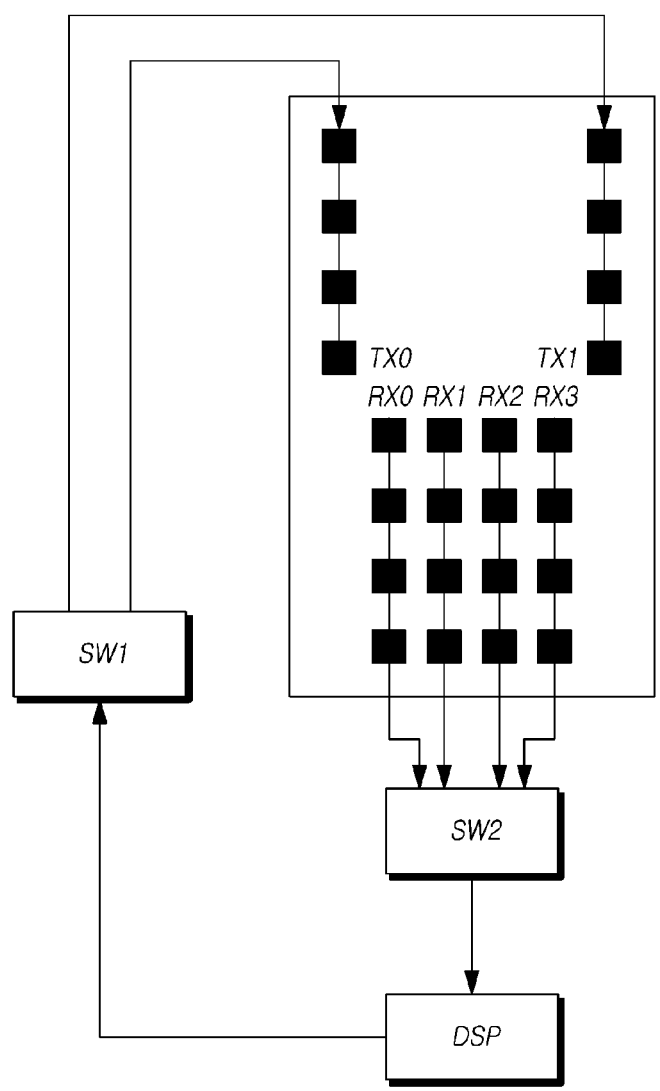
FIGS. 1A and 1B show an example of a radar apparatus having a common multi-antenna.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

Figure 1B:
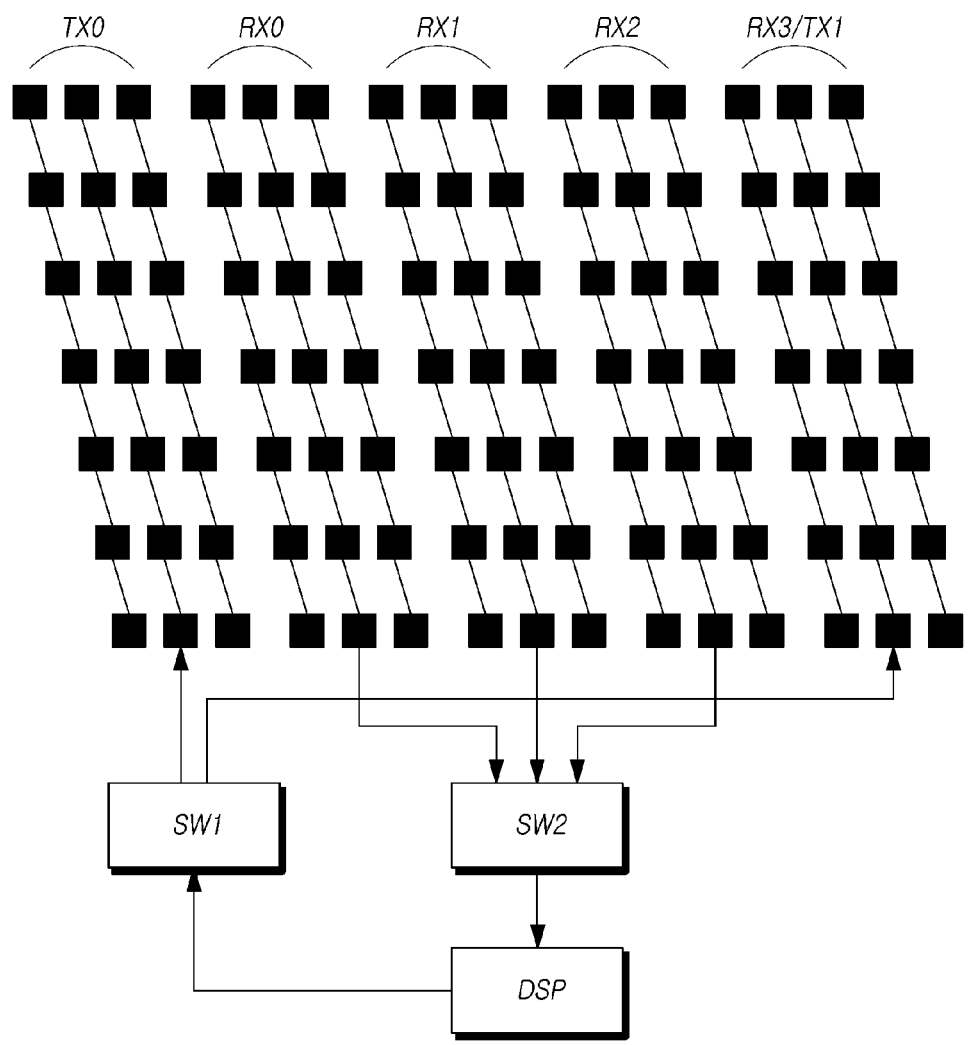

FIGS. 1A and 1B show an example of a radar apparatus having a common multi-antenna.

As shown in FIG. 1a, a radar apparatus has an antenna system in which two transmitting antennas TX0 and TX1 are disposed in the same direction at the upper portion and four receiving antennas RX0~RX3 are disposed in the same direction at the lower portion.

When a signal is to be transmitted, one transmitting antenna is selected by a first switch SW1 and transmits a transmission signal.

A reception signal reflected from an object is received by one receiving antenna switched by a second switch SW2.

A signal processor DSP can measure the distance from the object and the relative speed of the object by measuring a phase change, a magnitude change, a frequency difference etc. by amplifying a received reflection signal and comparing the amplified signal with the transmission signal.

In FIG. 1a, the antennas are one-line array antennas.

FIG. 1b shows an example of another multi-antennal radar apparatus, in which one transmitting antenna TX0, a plurality of receiving antennas RX0~RX2, and one transmitting-receiving antenna RX3/TX1 are arranged with gaps therebetween and the antennas are elongated in the same directions.

In this configuration, when a signal is to be transmitted, one of the transmitting antenna TX0 and the transmitting-receiving antenna RX3/TX1 is selected by a first switch SW1 and transmits a transmission signal.

A reception signal reflected from an object is received by one of the receiving antennas RX0~RX2 and the transmitting-receiving antenna RX3/TX1 selected by a second switch SW2.

A signal processor DSP can measure the distance from the object and the relative speed of the object by measuring a phase change, a magnitude change, a frequency difference etc. by amplifying a received reflection signal and comparing the amplified signal with the transmission signal.

Although the radar apparatus having the antenna system shown in FIGS. 1A and 1B can perform mid/long-range sensing and short-range sensing, has difficulty in having sufficient resolution or angular resolving power in both of the mid/long-range sensing and short-range sensing.

Further, in the antenna system shown in FIG. 1a, a plurality of transmitting antennas is elongated in the same direction and a plurality of receiving antennas is also elongated in the same direction, and in FIG. 1b, all transmitting and receiving antennas are elongated in the same direction.

Therefore, according to the antenna system, it is possible to exactly sense azimuth information, but it is difficult to precisely measure elevation information.

That is, in the antenna system shown in FIGS. 1A and 1B, any one or more of the receiving antennas RX0 to RX3 receive a reflection signal, but the receiving antennas have different horizontal arrangement characteristic from the transmitting antenna TX0 or TX1, so there are differences in the reception signals received by the receiving antennas. Accordingly, azimuth information can be exactly measured by analyzing the differences.

However, the receiving antennas have the same arrangement characteristic in the elevation direction as the transmitting antenna TX0 or TX1, so there is no difference in the reception signals received by the receiving antennas, and thus, it is difficult to measure elevation information of an object.

Accordingly, in an embodiment of the present disclosure, there is provided an antenna system including two transmitting groups composed of a plurality of transmitting antennas and elongated respectively in a first direction and a second direction that are opposite to each other in the elevation direction and two receiving antenna groups, similarly, composed of a plurality of receiving antennas and elongated in the first direction and the second direction, respectively, in order to improve the performance of detecting elevation information of an object.

Further, in the antenna system, one or more transmitting antennas to transmit a signal are appropriately selected and some of the signals received by the receiving antennas are selected and processed to improve measurement precision of azimuth information and elevation information of an object in both of mid/long-range sensing and short-range sensing.

Figure 2:
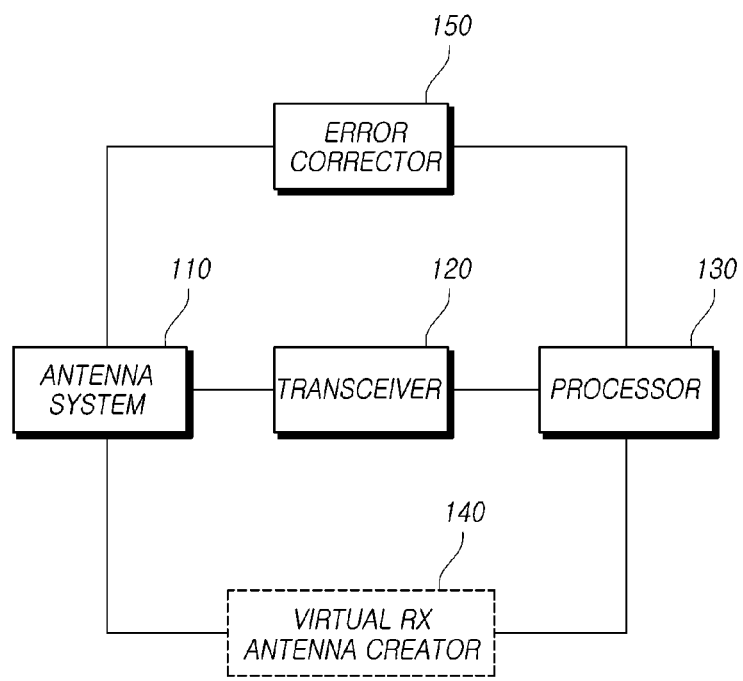
FIG. 2 is a schematic diagram of a radar apparatus that can correct an error according to an embodiment of the present disclosure.

FIG. 2 is a block diagram of a radar apparatus 100 according to an embodiment of the present disclosure.

As shown in FIG. 2, the radar apparatus 100 according to an embodiment of the present disclosure includes: an antenna system 110 including a transmitting antenna set including a plurality of antennas and a receiving antenna set including a plurality of receiving antennas; a transceiver 120 transmitting a transmission signal through the transmitting antenna set and receiving a reception signal through the receiving antenna set; and a processor 130 calculating and obtaining azimuth and elevation information of an object using the reception signals received by the receiving antennas. The radar apparatus is also called a radar sensor.

The radar apparatus 100 according to an embodiment of the present disclosure further includes: an error corrector 150 that determines an vertical mounting error on the basis of a difference between an vertical measurement value of a target object obtained by the processor and actual elevation information of the target object and changes the beam-forming directions of the receiving antennas on the basis of the error, thereby compensating the vertical mounting error.

The transmitting antenna set of the antenna system 110 includes a first transmitting antenna group composed of one or more transmitting antennas elongated in a first direction of vertical directions and a second transmitting antenna group composed of one or more transmitting antennas elongated in a second direction opposite to the first direction.

Similarly, the receiving antenna set included in the antenna system 110 includes a first receiving antenna group composed of one or more receiving antennas elongated in the first direction and a second receiving antenna group composed of one or more receiving antennas elongated in the second direction.

The detailed configuration of the antenna system 110 will be described in detail below with reference to FIGS. 3 and 4.

The transceiver 120 includes: a transmitter that switches to one of the transmitting antennas included in the antenna system 110 having a structure to be described with reference to FIG. 2 etc. and transmits a transmission signal through the switched transmitting antenna or through a multi-transmitting channel assigned to the transmitting antennas; and a receiver that switches to one of the receiving antennas and receives a reception signal that is a reflection signal of the transmission signal reflected from a target through the switched receiving antenna or through a multi-receiving channel assigned to the receiving antennas.

The transmitter included in the transceiver 120 includes an oscillator that generates a transmission signal for one transmitting channel assigned to a switched transmitting antenna or a multi-channel assigned to a plurality of transmitting antennas. The oscillator, for example, may include a voltage-controlled oscillator (VCO) and an oscillator.

The receiver included in the transceiver 120 includes: a low-noise amplifier (LNA) that low-noise amplifies the reception signal received through one receiving channel assigned to a switched receiving antenna or through a multi-receiving channel assigned to a plurality of transmitting antenna; a mixer that mixes the low-noise amplified reception signal; an amplifier that amplifies the mixed receiving signals; and an analog-to-digital converter (ADC) that generates reception data by digital-converting the amplified reception signal.

Referring to FIG. 2, the radar apparatus 100 according to an embodiment of the present disclosure includes a processor 130 that controls a transmission signal and performs signal processing using reception data. The processor 130 allows for reducing costs and hardware size too by efficiently distributing signal processing, which requires a large amount of calculation, to a first processor and a second processor.

The first processor included in the processor 130 is a pre-processor for the second processor and can obtain transmission data and reception data, control generation of a transmission signal by the oscillator based on the obtained transmission data, synchronize the transmission data and reception data, and changes frequencies of the transmission data and reception data.

The second processor is a post-processor that actually performs processing using the processing result of the first processor and can perform CFAR (Constant False Alarm Rate) calculation, tracking, and target selection on the basis of the reception data with frequency changed by the first processor, and perform extract angular information, speed information, and distance information on a target.

The first processor can buffer the obtained transmission data and reception data into a sample size that can be processed for one cycle and change the frequency. The frequency change by the first processor may use Fourier transform such as FFT (Fast Fourier Transform).

The second processor may perform second Fourier transform on the signals that has undergone first Fourier transform (FFT) by the first processor and the second Fourier transform, for example, may be Discrete Fourier Transform (hereafter, referred to as 'DFT'). Further, it may be chirp-DFT of DFT.

The second processor obtains frequency values corresponding to a second Fourier transform length (K) through the second Fourier transform, calculates a bit frequency having the largest power for each chirp period on the basis of the obtained frequency values, and obtain speed information and distance information of an object on the basis of the calculated bit frequency, whereby it can detect an object.

Figure 3:
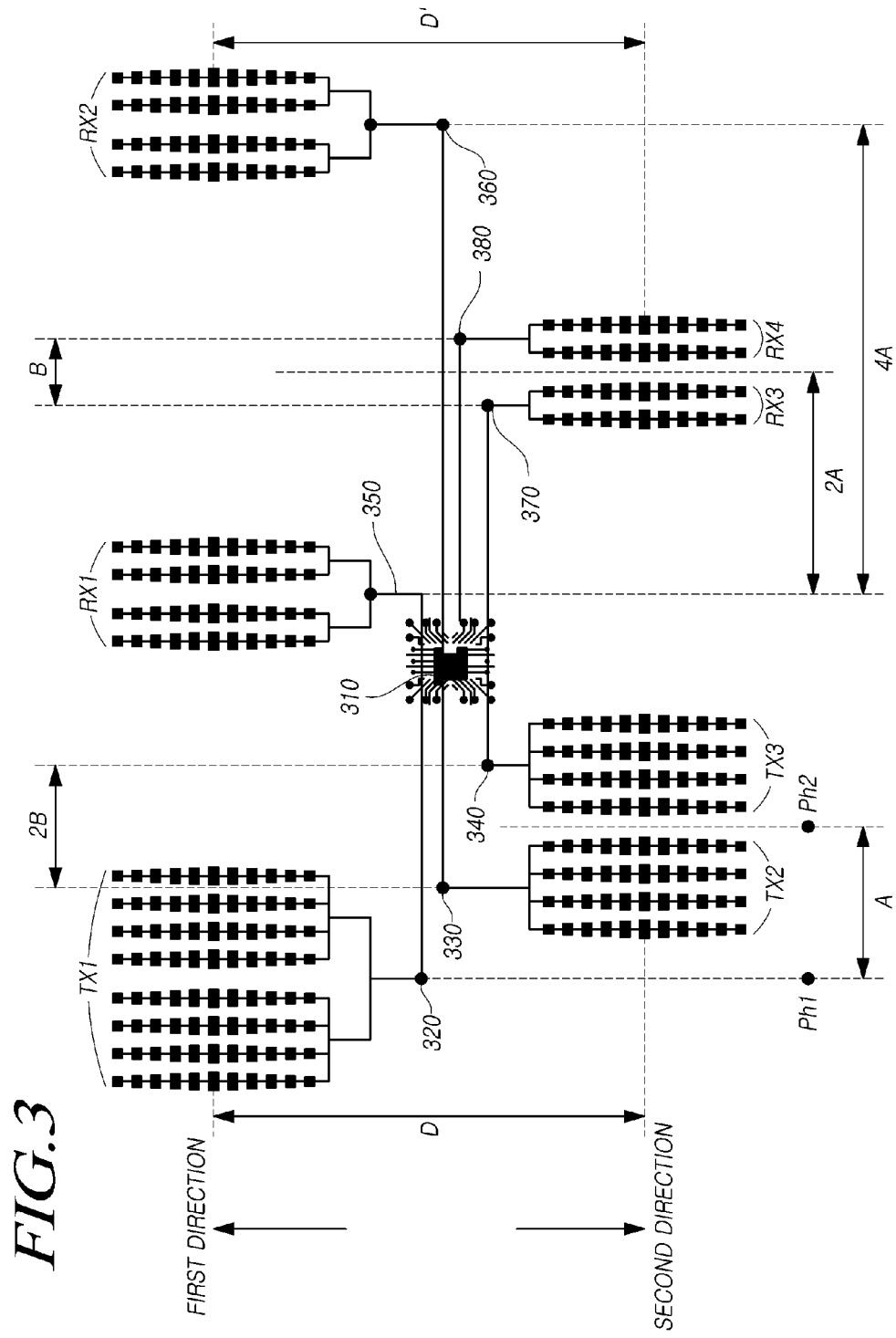
FIG. 3 shows a first example of arrangement of a plurality of transmitting antennas and a plurality of receiving antennas included in an antenna system included in a radar apparatus according to an embodiment of the present disclosure.
Figure 4:
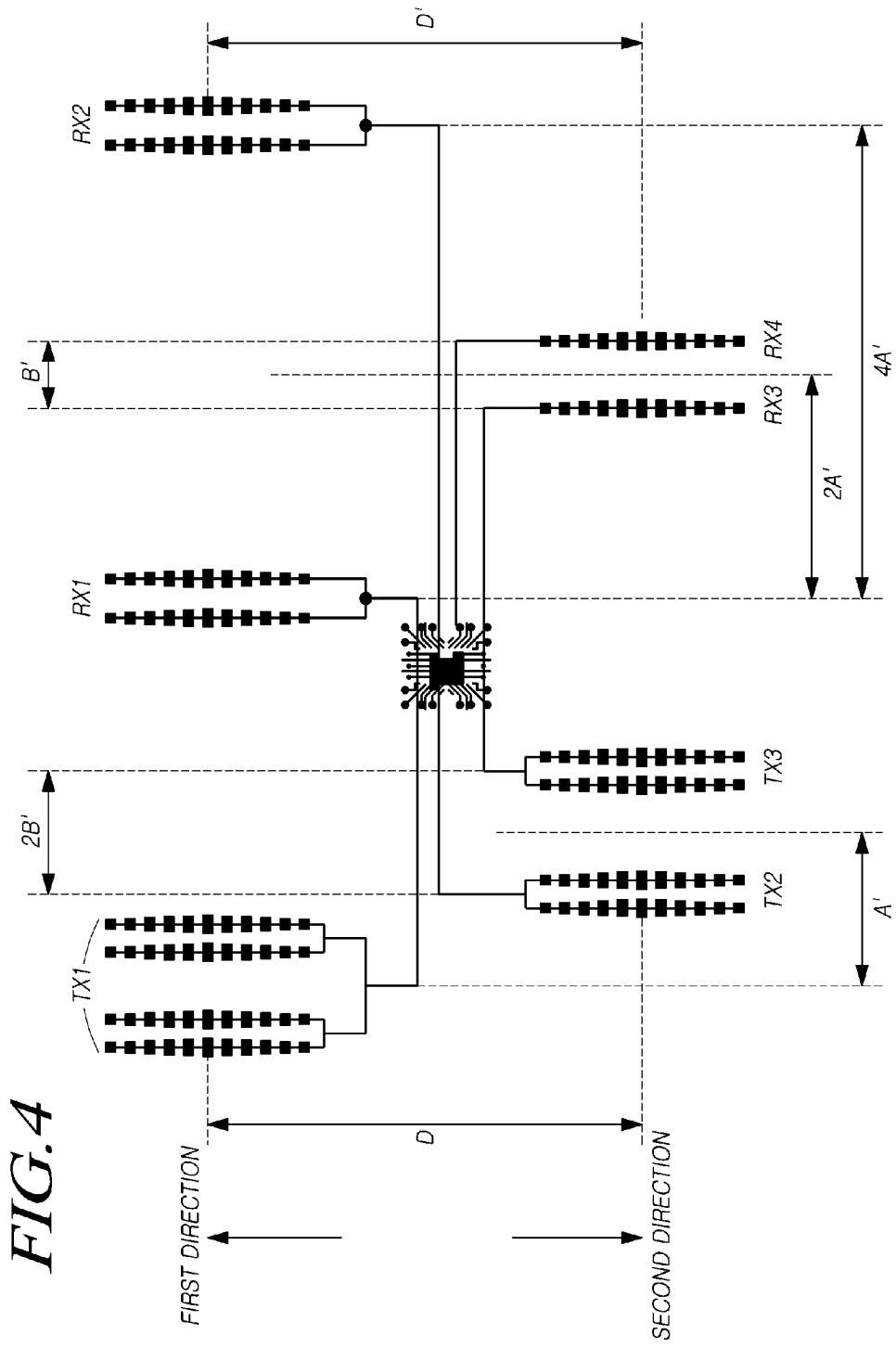
FIG. 4 shows a second example of arrangement of a plurality of transmitting antennas and a plurality of receiving antennas included in an antenna system included in a radar apparatus according to an embodiment of the present disclosure.

Meanwhile, the transceiver 120 and the processor 130 have the antenna systems shown in FIGS. 3 and 4 included in the radar apparatus according to this embodiment and have a predetermined signal transmitting/receiving method and should be able to implement an information obtaining method using the transmitting/receiving method in order to obtain elevation information and azimuth information of an object, particularly, a target of which an vertical mounting error is compensated, in a mid/long-range sensing mode and a short-range sensing mode, which will be described below in detail with reference to FIGS. 5 to 9.

The error corrector 150 according to this embodiment determines an vertical mounting error on the basis of a difference between an vertical measurement value of a target object obtained by the processor 130 and actual elevation information of the target object, changes the beam-forming directions of the receiving antennas on the basis of the error, thereby compensating the vertical mounting error of the radar apparatus.

In detail, the error corrector digitally compensates for a vertical error of the radar apparatus by changing the forming-directions of reception beams by assigning a complex weight to each receiving channels of the receiving antennas spaced in the elevation direction in accordance with the vertical mounting error.

This error correction method will be described below in detail with reference to FIGS. 11 to 13.

The antenna system 110 included in the radar apparatus 100 according to an embodiment of the present disclosure includes a plurality of transmitting antennas and a plurality of receiving antennas and may have various antenna arrays, depending on the array order and gap.

In detail, the antenna system 110 of the radar apparatus according to this embodiment includes a plurality of transmitting antennas and a plurality of receiving antennas. The first transmitting antenna group and a first receiving antenna group are formed respectively by arranging some of the transmitting antennas and the receiving antennas in the first direction that is one of vertical directions, and the second transmitting antenna group and the second receiving antenna group are formed respectively by arranging the other antennas in the second direction opposite to the first direction.

When sensing an object using the antenna system having this configuration, one or more of the transmitting antennas and one or more of the receiving antennas that are used to process signals should be included in different groups to sense elevation information of the object.

The transmitting antennas and the receiving antennas may be array antennas of which a plurality of transmitting/receiving elements is connected in series by transmission wires, but they are not limited thereto.

However, the antennas used in this embodiment are elongated in predetermined directions and the directions mean the directions in which the antennas are elongated with respect to a transmission port connected to a chip 310 including a signal processor.

FIG. 3 shows a first embodiment of arrangement of a plurality of transmitting antennas and a plurality of receiving antennas included in an antenna system included in the radar apparatus according to an embodiment of the present disclosure.

For convenience, the up-direction of the vertical directions is defined as a first direction and the down-direction of the vertical directions is defined as a second direction herein.

The antenna system according to a first example of FIG. 3 includes a first transmitting antenna TX1 that is elongated in the first direction that is the up-direction of the vertical directions, and a second transmitting antenna TX2 and a third transmitting antenna TX3 that are elongated in the second direction that is the down-direction of the vertical directions.

That is, one transmitting antenna, that is, the first transmitting antenna TX1 constitutes a first antenna group, and two transmitting antennas, that is, the second transmitting antenna TX2 and the second transmitting antenna TX3 constitute a second transmitting antenna group.

The first transmitting antenna TX1 may be composed of a total of n array antennas disposed in parallel, and n is 8 in the first example of FIG. 3.

The array antennas each include a plurality of elements or patches connected through a transmission line and the elongation direction is determined on the basis of a start point that is a feeding port 320 connected to a chip 310 including a signal processor.

That is, the eight array antennas included in the first transmitting antenna TX1 are elongated in the first direction that is the up-direction of the vertical directions.

The second transmitting antenna TX2 and the third transmitting antenna TX3 included in the second transmitting antenna group each may be composed of m array antennas disposed in parallel and m is 4 in the first example of FIG. 3.

The four array antennas constituting the second transmitting antenna TX2 are elongated in the second direction that is the down-direction of the vertical directions from a feeding port 330 and the four array antennas constituting the third transmitting antenna TX3 are elongated in the second direction that is the down-direction of the vertical directions from a feeding port 340.

Meanwhile, the antenna system according to the first example of FIG. 3 includes receiving antennas, that is, a first receiving antenna RX1 and a second receiving antenna RX2 that are elongated in the first direction that is the up-direction of the vertical directions, and a third receiving antenna RX3 and a fourth receiving antenna RX4 that are elongated in the second direction that is the down-direction of the vertical directions.

That is, two receiving antennas, that is, the first receiving antenna RX1 and the second receiving antenna RX2 constitute a first antenna group, and two receiving antennas, that is, the third receiving antenna RX3 and the fourth receiving antenna RX4 constitute a second antenna group.

The first receiving antenna RX1 and the second receiving antenna RX2 each may be composed of a total of m array antennas, similar to the second transmitting antenna TX2 or the third transmitting antenna TX3, and m is 4 in the first example of FIG. 3.

That is, as shown in FIG. 3, the first receiving antenna RX1 and the second receiving antenna RX2 each include a total of four array antennas connected in parallel, in which two pairs of array antennas may be arranged in parallel.

The four array antennas constituting the first receiving antenna RX1 are elongated in the first direction that is the up-direction of the vertical directions from a feeding port 350 and the four array antennas constituting the second receiving antenna RX2 are elongated in the first direction that is the up-direction of the vertical directions from a feeding port 360.

Further, as will be described below, the first receiving antenna RX1 and the second receiving antenna RX2 are spaced horizontally at a predetermined distance from each other, in detail, they are spaced four times the horizontal distance A between the first transmitting antenna group and the second transmitting antenna group.

The third receiving antenna RX3 and the fourth receiving antenna RX4 constituting the second receiving antenna group each may be composed of k array antennas and k is 2 in the first example of FIG. 3.

That is, as show in FIG. 3, the third receiving antenna RX3 and the fourth receiving antenna RX4 are each composed of two array antennas connected in parallel. The two array antennas constituting the third receiving antenna RX3 are elongated in the second direction that is the down-direction of the vertical directions from a feeding port 370 and the two array antennas constituting the fourth receiving antenna RX4 are elongated in the second direction that is the down-direction of the vertical directions from a feeding port 380.

The third receiving antenna RX3 and the fourth receiving antenna RX4 are horizontally spaced from each other at a predetermined horizontal distance B, in which the horizontal distance B between the third receiving antenna RX3 and the fourth receiving antenna RX4 may be ½ of the horizontal distance between the second transmitting antenna TX2 and the third transmitting antenna TX3.

The transmitting antennas and the receiving antennas of the antenna system according to this embodiment may have predetermined gap, which will be described in detail below.

First, the first transmitting antenna group (the first transmitting antenna TX1) is vertically spaced by a first vertical distance D from the second transmitting antenna group (that is, the second transmitting antenna TX2 and the third transmitting antenna TX3). In detail, as shown in FIG. 3, the vertical center position of the first transmitting antenna TX1 and the vertical center position of the second transmitting antenna TX2 (or the third transmitting antennas TX3) are spaced by the first vertical distance D from each other.

Similarly, the first receiving antenna group (that is, the first receiving antenna RX1 and the second receiving antenna RX2) is vertically spaced by a second vertical distance D' from the second receiving antenna group (that is, the third receiving antenna RX3 and the fourth receiving antenna RX4). In detail, as shown in FIG. 3, the vertical center position of the first receiving antenna RX1 (or the second receiving antenna RX2) and the vertical center position of the third receiving antenna RX3 (or the fourth receiving antenna RX4) are spaced by the second vertical distance D' from each other.

That is, for both of the transmitting antennas and the receiving antennas, the antenna groups elongated in opposite directions are horizontally spaced from corresponding antenna groups by the first vertical distance D or the second vertical distance D'.

The first vertical distance D and the second vertical distance D' may be the same, but are not limited thereto.

Hereafter, it is exemplified that first vertical distance D and the second vertical distance D' are the same and are in combination are referred to as a vertical distance.

As will be described below, the vertical arrangement makes it possible to precisely measure elevation information of an object.

The vertical distance D may be determined in consideration of the frequency of a transmission signal or the measurement precision of the elevation information of an object.

Further, the first transmitting antenna group (the first transmitting antenna TX1) is horizontally spaced by a horizontal distance A from the second transmitting antenna group (that is, the midpoint between the second transmitting antenna TX2 and the third transmitting antenna TX3). In detail, as shown in FIG. 3, the horizontal midpoint Ph1 of the first transmitting antenna TX1 is spaced by a horizontally distance A from the midpoint between Ph2 the second transmitting antenna TX2 and the third transmitting antennas TX3.

The horizontal distance A between the first transmitting antenna group and the second transmitting antenna group, as will be described below, has a predetermined relationship with the gap between a plurality of receiving antennas or the distance between the second transmitting antenna TX2 and the third transmitting antenna TX3 of the second transmitting antenna group.

In detail, assuming that the horizontal distance between the third receiving antenna RX3 and the fourth receiving antenna RX4 included in the second receiving antenna group is B, the horizontal distance between the second transmitting antenna TX2 and the third transmitting antenna TX3 included in the second transmitting antenna group may be 2B.

Further, the horizontal distance A between the first transmitting antenna group and the second transmitting antenna group may be 2B or more, and the first receiving antenna RX1 and the second receiving antenna RX2 of the first receiving antenna group are spaced respectively left and right from the second receiving antenna group (that is, midpoint between the third receiving antenna RX3 and the fourth receiving antenna RX4) by a horizontal distance 2A.

As a result, the horizontal distance between the first receiving antenna RX1 and the second receiving antenna RX2 of the first receiving antenna group is 4A.

The horizontal distance B between the third receiving antenna RX3 and the fourth receiving antenna RX4 of the second receiving antenna group may be smaller than the wavelength λ of a transmission signal used in the radar apparatus.

As described above, since the horizontal distance B between the third receiving antenna RX3 and the fourth receiving antenna RX4 of the second receiving antenna group is smaller than the wavelength λ of transmission/reception signals, it is possible to maintain a predetermined or more sensing angle in a short-range mode.

In general, it is possible to transmit a sharp beam of which the angular range becomes small as the entire antenna aperture area of a transmitting antenna becomes large, and as the antenna aperture area of a receiving antenna is large, signals can be received in smaller angular ranges.

Meanwhile, the more the number of the antennas disposed in a predetermined antenna aperture area, the more the sensing performance, that is, the resolution or the angular resolving power is improved.

That is, under the condition that an antenna aperture is the same, the smaller that gaps between a plurality of transmitting antennas transmitting signals or a plurality of receiving antennas receiving reflection signals for one sensing cycle, that is, the larger the number of a plurality of transmitting antennas transmitting signals or the larger the number of a plurality of receiving antennas receiving reflection signals for one sensing cycle, the more the resolution or the angular resolving power is increased, so more precise measurement is possible.

Accordingly, as will be described below, it is possible to secure a predetermined sensing angle or more required in a short-range sensing mode by making the horizontal distance B between the third receiving antenna RX3 and the fourth receiving antenna RX4, which are used in the short-range sensing mode, smaller than the wavelength λ of transmission/reception signals.

Further, as will be described below, in the short-range sensing mode, by using the second transmitting antenna TX2 and the third transmitting antenna TX3 spaced from each other by the horizontal distance 2B, an aperture expansion effect is generated through two virtual RX antennas, so horizontal sensing resolution on an object can be improved.

Further, since the horizontal distance A between the first transmitting antenna group and the second transmitting antenna group is larger than two times the horizontal distance B between the third receiving antenna RX3 and the fourth receiving antenna RX4, the beam width of a transmission signal can be adjusted.

That is, when the horizontal distance A between the first transmitting antenna group and the second transmitting antenna group is the same as two times the horizontal distance B between the third receiving antenna RX3 and the fourth receiving antenna RX4, the width of a transmission beam is reduced, so the transmission beam becomes too sharp. Accordingly, the horizontal distance A between the first transmitting antenna group and the second transmitting antenna group is set larger than two times the horizontal distance B between the third receiving antenna RX3 and the fourth receiving antenna RX4 so that the beam width of a transmission signal is maintained in a predetermined range or more.

In the antenna system according to an embodiment of the present disclosure, the first transmitting antenna TX1 is composed of a total of n array antennas, and the second transmitting antenna TX2, the third transmitting antenna TX3, the first receiving antenna RX1, and the second receiving antenna RX2 are each composed of m array antennas, and the third receiving antenna RX3 and the fourth receiving antenna RX4 are each composed of k array antennas, where the following Equation 1 is concluded among k, m, and n, $$n=2m=4k \qquad \text{[Equation 1]}$$

That is, the number n of the array antennas of the first transmitting antennas TX1 is two times the number m of the array antennas of one of the second transmitting antenna TX2, the third transmitting antenna TX3, the first receiving antenna RX1, and the second receiving antenna RX2, and is four times the number k of the array antennas of one of the third receiving antenna RX3 and the fourth receiving antenna RX4.

According to this configuration, as will be described below, uniform virtual antennas can be achieved in mid/long-range and short-range sensing modes, so it is possible to improve the horizontal sensing performance in both sensing modes.

Further, according to the antenna arrangement, it is possible to form a grating lobe, which has an adverse influence on the performance of an antenna, far from a main beam or a main lobe, so it is possible to improve the horizontal sensing resolution or horizontal resolving power in both sensing modes.

FIG. 4 shows a second embodiment of arrangement of a plurality of transmitting antennas and a plurality of receiving antennas included in an antenna system included in a radar apparatus according to an embodiment of the present disclosure.

The configuration of the antenna system included in a radar apparatus of FIG. 4 is basically the same as the first example of FIG. 3, but only the numbers of array antennas of transmitting antennas and receiving antennas are different.

In detail, the first transmitting antenna TX1 is composed of a total of eight array antennas, and the second transmitting antenna TX2, the third transmitting antenna TX3, the first receiving antenna RX1, and the second receiving antenna RX2 are each composed of four array antennas, and the third receiving antenna RX3 and the fourth receiving antenna RX4 are each composed of two array antennas in the first example of FIG. 3, whereas the numbers of the array antennas of each of transmitting antennas and receiving antennas are half those of the first example.

In the second example of FIG. 4, the first transmitting antenna TX1 is composed of a total of four array antennas, and the second transmitting antenna TX2, the third transmitting antenna TX3, the first receiving antenna RX1, and the second receiving antenna RX2 are each composed of two array antennas, and the third receiving antenna RX3 and the fourth receiving antenna RX4 are each composed of one array antenna.

Further, even in the second example of FIG. 4, the vertical distance between a first transmitting antenna group TX1 and a second receiving antenna group TX2 and TX3 and the vertical distance between the first receiving antenna group RX1 and RX2 and a second receiving antenna group RX3 and RX4 are set to D, similar to the example of FIG. 3.

Further, even in the example of FIG. 4, the horizontal distance A' between the first transmitting antenna group TX1 and a second receiving antenna group TX2 and TX3 is set two times or more of the horizontal distance B' between the third receiving antenna RX3 and the fourth receiving antenna RX4, and the horizontal distance between the first receiving antenna RX1 and the second receiving antenna RX2 of the first receiving antenna group may be 4A'.

However, in the example of FIG. 4, the horizontal distance B' between the third receiving antenna RX3 and the fourth receiving antenna RX4 should be smaller than the wavelength λ of a transmission signal.

That is, the horizontal distance B between the third receiving antenna RX3 and the fourth receiving antenna RX4 is set smaller that the wavelength λ of a transmission signal to increase the sensing angle in the short-range sensing mode in the first example of FIG. 3 that uses two array antennas as a basic unit array antenna, but when one array antenna is used a basic unit array antenna, as in FIG. 4, the short-range sensing angle can be increased by setting the horizontal distance B' between the third receiving antenna RX3 and the fourth receiving antenna RX4 to λ/2 or less.

According to this antenna configuration, it is possible to obtain elevation information such as the height of an object by, as will be described below, transmitting a signal through one of more of the first transmitting antenna group and the second transmitting antenna group vertically spaced from each other and processing a reception signal received through one or more of the first receiving antenna group and the second receiving antenna group vertically spaced from each other.

Finally, it is possible to precisely obtain elevation information of an object in both of the short-range sensing mode and the mid/long-range sensing mode by transmitting a signal through one or more of the first transmitting antenna group and the second transmitting antenna group and processing a reception signal received through one or more of the first receiving antenna group and the second receiving antenna group vertically spaced from each other.

That is, as will be described below, it is possible to precisely obtain not only azimuth information, but elevation information of an object in both of the mid/long-range sensing mode and the short-range sensing mode by appropriately selecting a transmitting antenna to transmit a radar signal and a receiving antenna to obtain the elevation/azimuth information of the object, depending on the sensing modes.

Figure 5A:
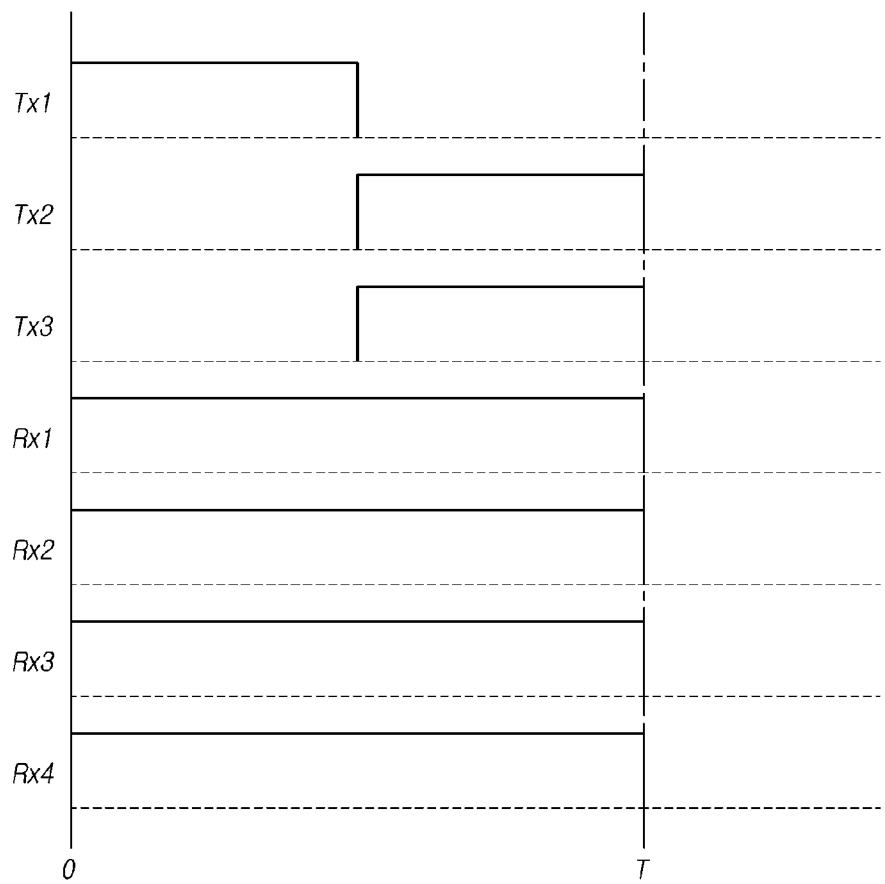

FIGS. 5A and 5B show a case of sensing azimuth information using the radar apparatus according to the present disclosure, particularly, in which a timing diagram of signals in a mid/long-range sensing mode (FIG. 5a) and an equivalent state diagram of transmitting and receiving antennas in this case (FIG. 5b) are provided.

In order to measure azimuth information of an object at a mid/long distance using the radar apparatus according to this embodiment, all of the transmitting antennas (first transmitting antenna TX1) included in the first transmitting antenna group and the transmitting antenna (second transmitting antenna TX2 and third transmitting antenna TX3) included in the second transmitting antenna group are used in a transmission mode, in which the transmitting antennas of the two groups time-divisionally and code-divisionally transmit transmission signals.

On the other hand, in a reception mode of receiving signals reflected from the object, azimuth information of the object at a mid/long distance is obtained using information received by all of the receiving antennas included in the first/second receiving antenna groups, that is, the first receiving antenna RX1 to the fourth receiving antenna RX4, in which the signals received by the third receiving antenna RX3 and the fourth receiving antenna RX4 included in the second receiving antenna group are combined and used as one channel.

In the following description, a total of three transmitting antennas TX1, TX2, and TX3 included in the first/second transmitting antenna groups may be referred to as transmitting channels and a total of four receiving antennas RX1, RX2, RX3, and RX4 included in the first/second receiving antenna groups may be referred to as receiving channels.

Accordingly, the radar apparatus according to this embodiment uses all of the three transmitting channels and four receiving channels to obtain azimuth information in the mid/long-range sensing mode. That is, the radar apparatus time-divisionally and code-divisionally transmits transmission signals through the second transmitting antenna TX2 and the third transmitting antenna TX3 included in the second transmitting antenna group in the three transmitting channels and through the first transmitting antenna TX1 of the first transmitting antenna group elongated in the first direction in a transmission mode, and uses all information received through the four receiving channels in a reception mode.

FIG. 5a is a timing diagram of transmission and reception signals in the mid/long-range sensing mode and shows time-division of time-division and code-division.

As in FIG. 5a, one sensing period (0~T) is time-divided, and the first transmitting antenna TX1 is turned on and transmits a transmission signal in the first period T/2, and the second transmitting antenna TX2 and the third transmitting antenna TX3 are turned on and transmit transmission signals in the next period T/2.

Meanwhile, in the same sensing periods, the four receiving antennas RX1~RX4 all receive signals and the processor 130 obtains azimuth information (width etc.) of an object at a mid/long distance by analyzing the reception signals received through the four channels.

In other words, in order to obtain azimuth information in the mid/long-range sensing mode, signals are transmitted time-divisionally or code-divisionally through a cluster of the two transmitting channels included in the second transmitting antenna group and through one transmitting channel included in the first transmitting antenna group in the transmission mode, and signals are received through a total of three receiving channels by combining the two receiving channels RX3 and RX4 included in the second receiving antenna group in the reception mode.

FIG. 5b is an equivalent state diagram of transmitting and receiving antennas in the mid/long-range sensing mode shown in FIG. 5a.

The equivalent state diagram of FIG. 5b shows the arrangement state of receiving antennas when two transmitting antenna channels that time-divisionally or code-divisionally transmit signals are fixed as one, and the degree of aperture of the radar apparatus can be seen from the figure.

When signals are transmitted and received in the mid/long-range sensing mode, as in FIG. 5a, since azimuth information of an object is not influenced by whether the first/second antenna groups are spaced or not, the position of the first transmitting antenna TX1 is assumed as a reference position in FIG. 5b.

Since the first transmitting antenna TX1 and the second transmitting antenna group are horizontally spaced by A, when the first transmitting antenna TX1 transmits a signal and then immediately the second transmitting antenna TX2 and the third transmitting antenna TX3 included in the second transmitting antenna group transmit signals in the same way, receiving antennas receive reflection signals reflected from an object as if they receive reflection signals that are the same but spatially horizontally shifted by A.

In this case, receiving antennas that virtually exist by the horizontal spacing of transmitting data etc. may be referred to as virtual receiving antennas as a concept discriminated the actually existing receiving antenna.

With respect to the first transmitting antenna TX1 in FIG. 5b, the first receiving antenna RX1, second receiving antenna RX2, third receiving antenna RX3, and fourth receiving antenna RX4 of the receiving antennas at the receiving end are real antennas.

Meanwhile, since FIGS. 5A and 5B show a case for obtaining azimuth information, the vertical spacing of the transmitting/receiving antennas can be neglected, so they are shown in the figure under the assumption that they are elongated in the same direction for convenience in the figure. That is, actually, the third receiving antenna RX3 and the fourth receiving antenna RX4 included in the second receiving antenna group are elongated in the second direction opposite to those elongated in the first direction of the first receiving antenna group, but since this is for obtaining azimuth information, they are assumed as being elongated in the first direction in disregard of the vertical spacing and the elongation directions.

Further, since the third receiving antenna RX3 and the fourth receiving antenna RX4 included in the second receiving antenna group are combined as one signal in the reception mode, they can be expressed as one channel.

As a result, there are provided three channels of real antennas spaced by the horizontal distance 2A, that is, a first real antenna RRX1, a second real antenna RRX2, and a third real antenna RRX3.

The second real antenna RRX2 at the center corresponds to the combination antenna of the third receiving antenna RX3 and the fourth receiving antenna Rx4 included in the second receiving antenna group.

With respect to the first transmitting antenna TX1, since the second transmitting antenna group is spaced horizontally by A from the first transmitting antenna group, the receiving antennas that receive signals transmitted from the second transmitting antenna group have the same effect as they are horizontally shifted by A from the actual positions and the receiving antennas created at the shifted position can be referred to as virtual RX antennas.

That is, a total of three virtual RX antennas, that is, a first virtual RX antenna VRX1, a second virtual RX antenna VRX2, and a third virtual RX antenna VRX3 are created at the distance A from the real antennas.

As a result, three channels of virtual RX antennas are created with a total of three real antennas at the receiving end.

Further, as described above, since the center of the second receiving antenna group (that is, the midpoint between the third receiving antenna RX3 and the fourth receiving antenna RX4) is spaced by the horizontal distance 2A from the first receiving antenna RX1 and the second receiving antenna RX2 and the virtual RX antennas are shifted by the horizontal distance A from the rear antennas, consequently, a total of six channels of receiving antennas are spaced from adjacent receiving antennas by the same distance A, as shown in FIG. 5b.

Further, the entire aperture of the receiving end, that is, the horizontal distance between the first real antenna RRX1 at an end and a third virtual RX antenna VRX3 at the other end is 5A.

Accordingly, using the radar apparatus of this embodiment increases the entire aperture of the receiving end from 4A to 5A and decreases the gaps between the receiving antennas, so it is possible to improve the resolving power or resolution on azimuth information in the mid/long-range sensing mode.

In general, since a radar apparatus performs an object detection function that detects the distance to an object and the speed and azimuth of the object using reception signals received through a plurality of receiving antennas, in which in order to increase precision of detection of an object (that is, increase resolution), it is preferable that the radar apparatus has an antenna system with an "expanded aperture structure" by increasing the gaps between the receiving antennas.

The distance from an end to the other end of a receiving antenna is the aperture and it is a very important factor of the performance of a radar apparatus to provide an expanded aperture performance by increasing the aperture of the receiving antenna.

By providing an antenna system with an expanded aperture structure, the position where a grating lobe is generated at the receiving end is moved closer to the center position where the main beam is positioned.

Accordingly, an "expanded aperture structure" or a "virtual antenna system" is provided for the radar apparatus according to an embodiment of the present disclosure in order to move the position where a grating lobe is generated away from the center position where the main beam is positioned, that is, to suppress grating lobe.

In order to have the virtual antenna system, as shown in FIGS. 1A and 1B, the radar apparatus 100 according to an embodiment of the present disclosure may further include a virtual RX antenna creator 140 for creating a plurality of virtual RX antennas.

The virtual RX antenna creator 140, as described above, can perform signal processing for generating signals having a predetermined phase difference that depends on the gap between receiving antennas on the basis of a signals received by actual receiving antennas.

That is, the virtual RX antenna creator 140 performs signal process for generating a virtual signal (a signal having a phase difference from the actually received signal) as if a signal has been received through a virtual RX antenna that virtually exists at a position where there is no actual receiving antenna.

The "creating a virtual RX antenna" herein may have the same meaning as "a reception signal that has not been actually received is generated". In this respect, the arrangement structure (gap, number etc.) of virtual RX antennas may have the same meaning as the structure (gap, number etc.) of reception signals that are not actually received.

By the virtual RX antenna creator 140, an antenna system in which not only a plurality of receiving antennas actually exist, but a plurality of virtual RX antennas virtually exist at the receiving end can be provided.

As described above, the antenna system including a plurality of virtual RX antennas virtually existing at the receiving end may be expressed as an "antenna system having a virtual aperture structure".

As described above, in order to obtain azimuth information in the mid/long-range sensing mode, the transceiver 120 of the radar apparatus according to this embodiment, in the mid/long-range sensing mode, has to transmit signals time-divisionally or code-divisionally through the first transmitting antenna TX1 included in the first transmitting antenna group, and the second transmitting antenna TX2 and the third transmitting antenna TX3 included in the second transmitting antenna group and has to receive reflection signals reflected from an object through all of the receiving antennas included in the receiving antenna set. Further, the processor 130 obtains azimuth information of the object at a mid/long distance on the basis of the reflection signals received through all of the receiving antennas.

As described above, the radar apparatus according to this embodiment, has the antenna arrangement structures shown in FIGS. 3 and 4, and has the signal transmission/reception configuration shown in FIG. 5a, so it secures an expanded aperture performance and can precisely measure the azimuth information of an object.

Meanwhile, the transceiver 120, the processor 130, the virtual antenna creator 140, the error corrector 150 etc. included in the radar apparatus 100 according to this embodiment may be implemented as modules of a radar controller or an ECU that performs an object recognition function through a radar.

Such a radar controller or ECU may include a processor, a storage device such as a memory, and computer programs that can perform specific functions, and the transceiver 120, the processor 130, the virtual antenna creator 140, the error corrector 150 etc. may be implemented as software modules that can perform their own functions.

Figure 6A:
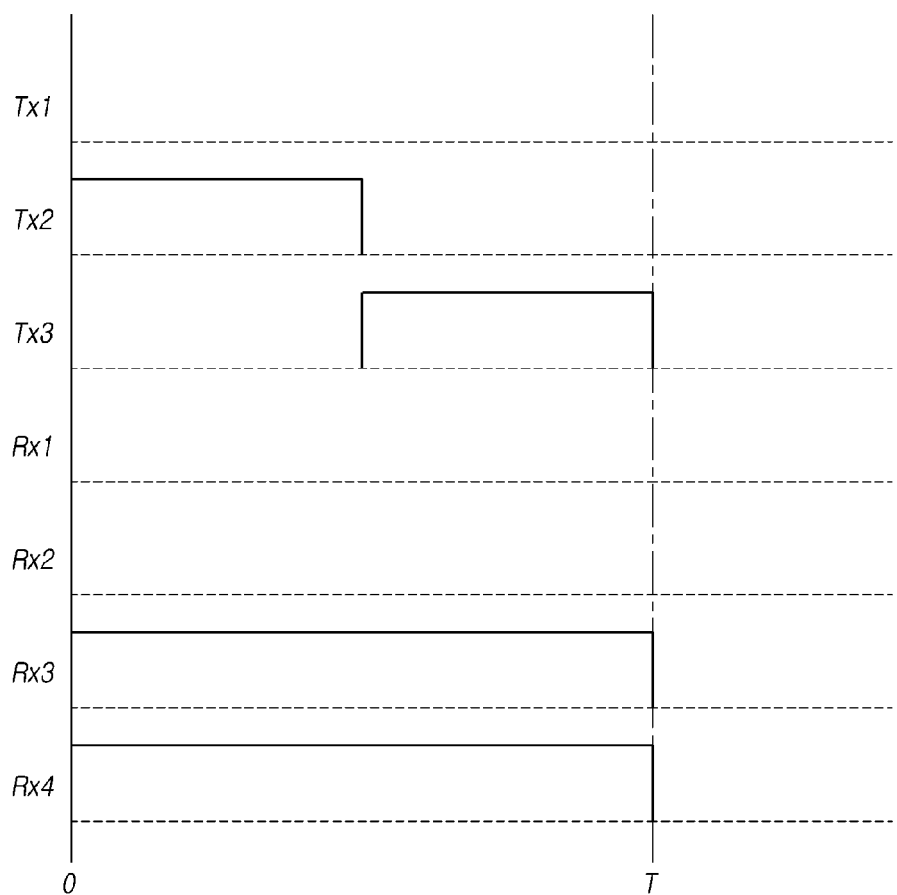
FIGS. 6A and 6B show a case of sensing azimuth information using the antenna configuration according to a first example, in which a timing diagram of signals in a short-range sensing mode (FIG. 6a) and an equivalent state diagram of transmitting and receiving antennas in this case (FIG. 6b) are provided.
Figure 6B:
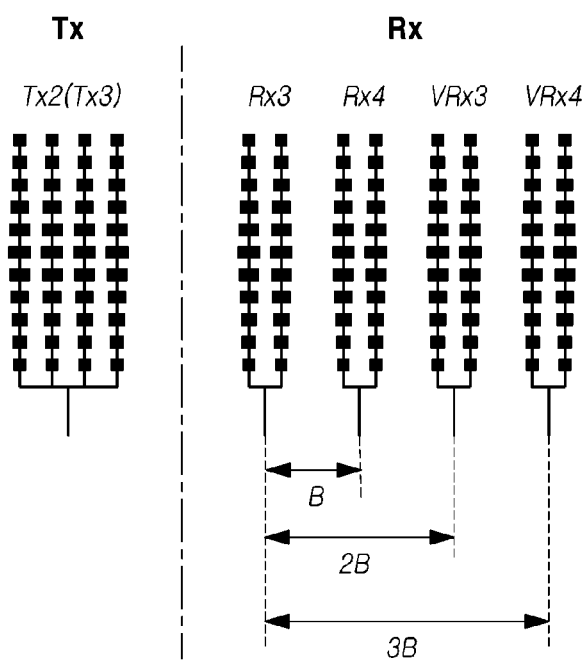

FIGS. 6A and 6B show a case of sensing azimuth information using the radar apparatus according to the this embodiment, in which timing diagram of signals in a short-range sensing mode (FIG. 6a) and an equivalent state diagram of transmitting and receiving antennas in this case (FIG. 6b) are provided.

In order to obtain azimuth information of an object at a short distance, the transceiver 120 of the radar apparatus according to this embodiment, in the antenna systems of FIGS. 3 and 4, transmits transmission signals time-divisionally or code-divisionally through the second transmitting antenna TX2 and the third transmitting antenna TX3 included in the second transmitting antenna group.

Further, the radar apparatus calculates azimuth information of the object at a short distance on the basis of signals received by the third receiving antenna RX3 and the fourth receiving antenna RX4 included in the second receiving antenna group at the receiving end.

That is, the radar apparatus according to this embodiment, in the short-range sensing mode, transmits transmission signals time-divisionally and code-divisionally through two transmitting antennas TX2 and TX3 included in the second transmitting antenna group elongated in the second direction and obtains azimuth information of an object on the basis of the signals received through two receiving antennas RX3 and RX4 included in the second receiving antenna group elongated in the second direction.

Obviously, all of the receiving antennas at the receiving end can receive reflection signals from the object in the short-range sensing mode, and only the reception signals received through the third receiving antenna RX and the fourth receiving antenna RX4 of four channels of receiving antennas can be used to obtain azimuth information of an object at a short distance.

FIG. 6a is a timing diagram of transmission and reception signals in the mid/long-range sensing mode and shows time-division of code division and code-division.

As in FIG. 6a, one sensing period (0~T) is time-divided, and the second transmitting antenna TX2 included in the second transmitting antenna group is turned on and transmits a transmission signal in the first period T/2, and the third transmitting antenna TX3 is turned on and transmits a transmission signal in the next period T/2.

Further, at the receiving end, the two receiving antennas included in the second receiving antenna group, that is, the third receiving antenna RX3 and the fourth receiving antenna RX4 receive signals in the same sensing periods, and the processor 130 obtains azimuth information (width etc.) of the object at a short distance by analyzing the reception signal received through two channels.

In other words, in order to obtain azimuth information in the short-range sensing mode, transmission signals are time-divisionally or code-divisionally transmitted through two transmitting channels included in the second transmitting antenna group in the transmission mode, and signals are received through two receiving channels RX3 and RX4 included in the second receiving antenna group in the reception mode.

FIG. 6b shows an equivalent state of transmitting and receiving antennas in the short sensing mode shown in FIG. 6a.

Similar to the equivalent state diagram of FIG. 5b, it is assumed that the position of the second transmitting antenna TX2 is a reference position.

Since the second transmitting antenna TX2 and the third transmitting antenna TX3 that time-divisionally transmit signals are horizontally spaced by 2B, when the second transmitting antenna TX2 transmits a signal and then immediately the third transmitting antenna TX3 transmits a signal, receiving antennas receive reflection signals reflected from an object as if they receive reflection signals that are the same but spatially horizontally shifted by 2B.

Accordingly, as shown in FIG. 6b, with respect to the second transmitting antenna TX2, at the reception end, the third receiving antenna RX3 and the fourth receiving antenna RX4 are real antennas, and two virtual RX antennas, that is, a third virtual RX antenna VRX3 and a fourth virtual RX antenna VRX4 are created adjacent to the real antennas.

Since the third receiving antenna RX3 and the fourth receiving antenna RX4 are horizontally spaced by B and the virtual RX antennas are horizontally shifted by 2B from the real antennas, respectively, the gaps between fourth receiving antennas forming the reception end are maintained the same as B.

That is, by using the radar apparatus according to this embodiment, in the short-range sensing mode, a total of four receiving channels horizontally spaced by B are formed at the receiving end, and the entire aperture of the receiving end, that is, the horizontal distance between the third receiving antenna RX3 at an end of the receiving end and the fourth virtual RX antenna VRX4 at the other end is 3B.

Accordingly, by using the radar apparatus according to this embodiment, the entire aperture of the receiving end is expanded from 2B to 3B by the virtual aperture structure, so it is possible to improve resolving power or resolution on azimuth information in the short-range sensing mode.

To this end, the virtual RX antenna creator 140 included in the radar apparatus according to this embodiment creates one or more virtual RX antennas VRX1~3 between the first receiving antenna RX1 to the fourth receiving antenna RX4 in the mid/long-range sensing mode and creates one or more virtual RX antennas VRX3 and VRX4 at sides of the third receiving antenna RX3 and the fourth receiving antenna RX4 in the short-range sensing mode.

Further, in order to obtain azimuth information in the short-range sensing mode, the transceiver 120 of the radar apparatus according to this embodiment transmits transmission signals time-divisionally or code-divisionally through the second transmitting antenna TX2 and the third transmitting antenna TX3 in the short-range sensing mode and receives reflection signals reflected from an object through the receiving antenna set. Further, the processor 130 obtains azimuth information of the object at a short distance on the basis of reflection signals received through the third receiving antenna and the fourth receiving antenna.

Meanwhile, in the radar apparatus according to this embodiment, as described with reference to FIGS. 3 and 4, a first transmitting antenna group and a first receiving antenna group are formed by elongating some of a plurality of transmitting antennas and a plurality of receiving antennas in the first direction that is one of the vertical direction, and a second transmitting antenna group and a second receiving antenna group are formed by elongating the other antennas in the second direction opposite to the first direction; and one or more of the transmitting antennas that transmit transmission signals and one or more of the receiving antennas that receive reflection signals in the process of transmitting/receiving signals are included in different groups in order to be able to sense elevation information of an object, which will be described in detail below.

According to the arrangement of the antennas in the radar apparatus according to this embodiment, the first transmitting antenna group and the first receiving antenna group are elongated in the first direction of the vertical directions, the second transmitting antenna group and the second receiving antenna group are elongated in the second direction opposite to the first direction, and a vertical distance D is vertically given between the first and second groups.

Accordingly, when signals are received through one or more of the transmitting channels and reflection signals are received through two receiving channels vertically spaced, predetermined phase differences or magnitude differences are generated between the reception signals received through the receiving channels or the transmission signals and the reception signals received through the channels.

Accordingly, elevation information such as the height of an object can be obtained by comparing the phase differences or the magnitude differences of the signals for the receiving channels.

Figure 7:
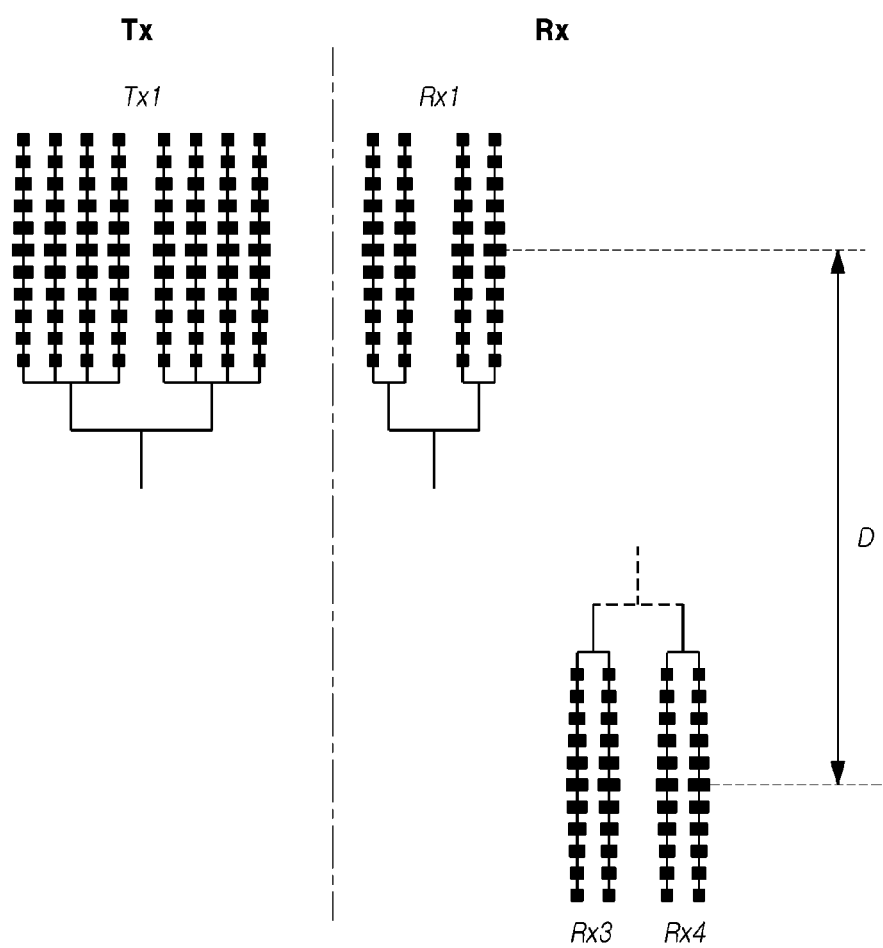
FIG. 7 shows the first embodiment that senses elevation information using a radar apparatus.
Figure 8:
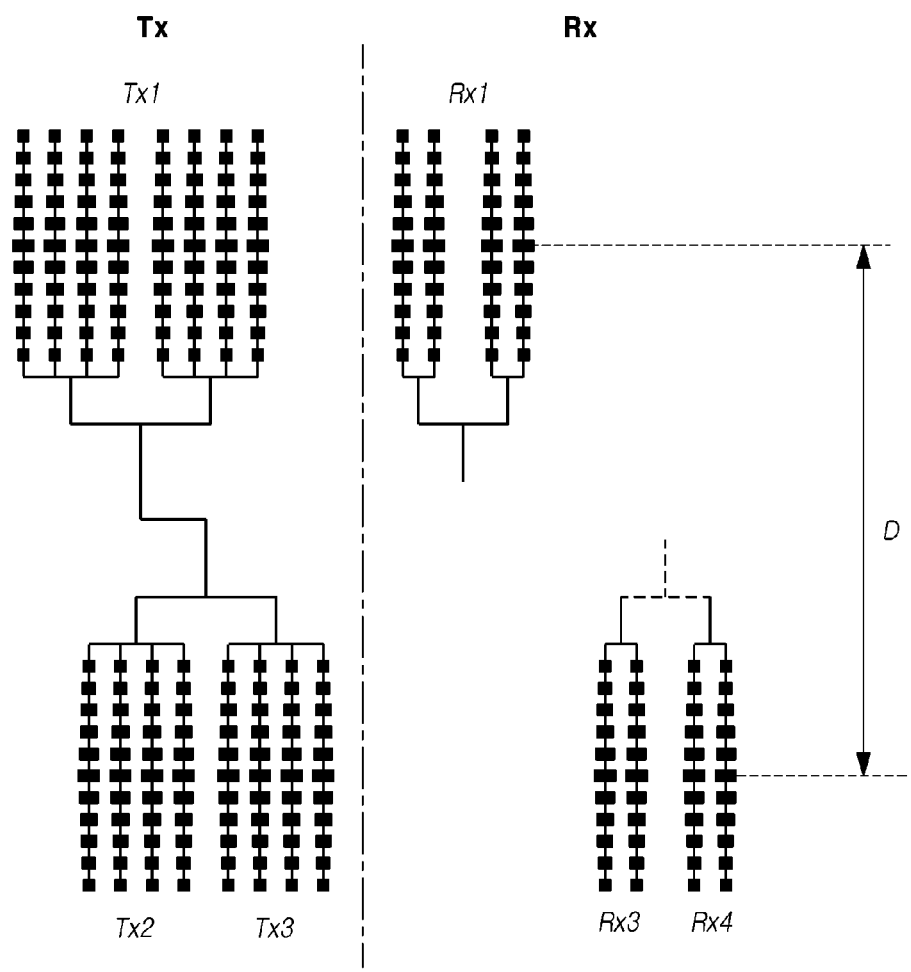
FIG. 8 shows the second embodiment that senses elevation information using a radar apparatus.
Figure 9:
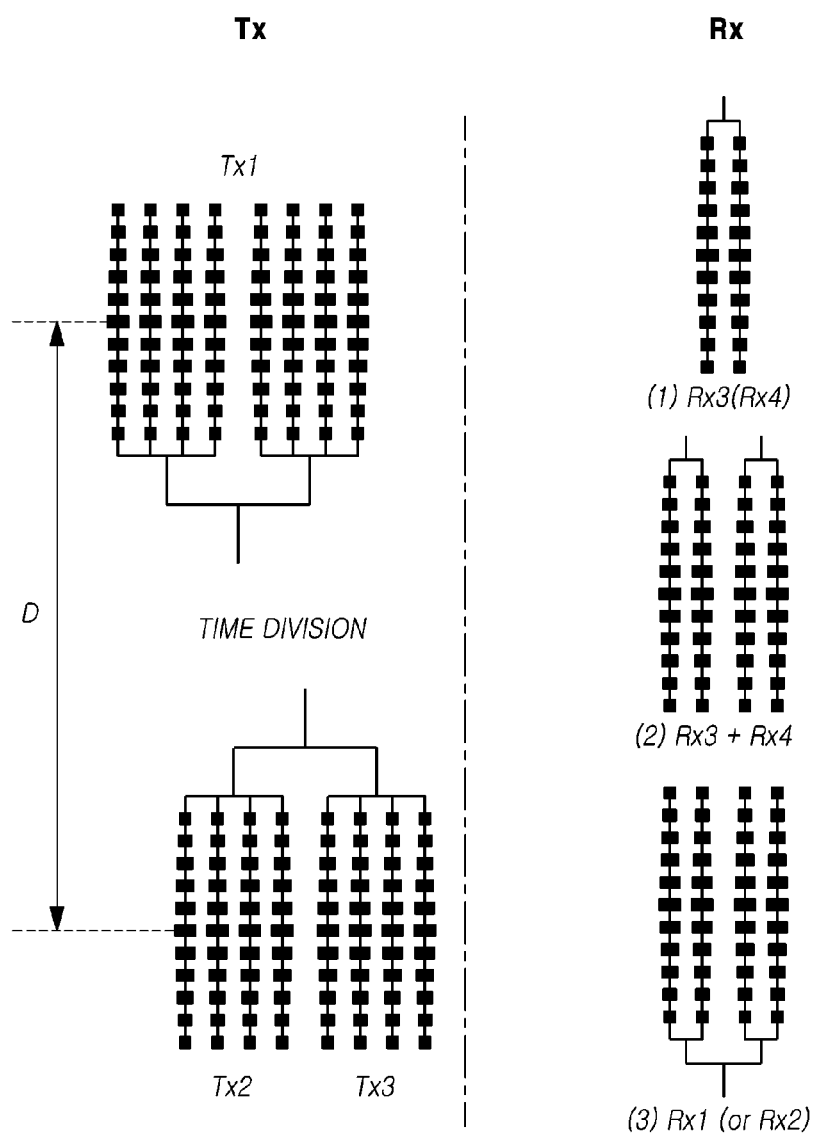
FIG. 9 shows the third embodiment that senses elevation information using a radar apparatus.

The method of transmitting/receiving signals for obtaining elevation information may include three embodiments shown in FIGS. 7 to 9, but is not limited thereto.

First, FIG. 7 shows a method of using one transmitting channel and two vertically spaced receiving channels.

FIG. 7 shows a first embodiment that senses elevation information using a radar apparatus.

In detail, FIG. 7 shows only transmitting and receiving antennas that are actually used in the transmitting and receiving antennas shown in FIG. 3 etc. to obtain elevation information by the first embodiment.

As shown in FIG. 7, in the first embodiment for obtaining elevation information, a transmission signal is transmitted through only one transmitting channel of three transmitting channels, and two vertically spaced receiving channels can be used.

For example, as shown in FIG. 7, a first transmitting antenna TX1, and at the receiving end transmits a signal, and signals received through a first receiving antenna RX1 included in a first receiving antenna group and two receiving antennas RX3 and RX4 included in a second receiving antenna group vertically spaced by D from the first receiving antenna RX1 are used.

The first receiving antenna RX1 constitutes one first receiving channel, and signals of the third receiving antenna RX3 and the fourth receiving antenna RX4 included in the second receiving antenna group can be combined and used as one second receiving channel. Constituting one second receiving channel by combining the signals of the third receiving antenna RX3 and the fourth receiving antenna RX4 is for match the number with the number of the array of the corresponding first receiving antenna RX1.

By using this signal transmission/reception method, reflection signals based on the same transmission signals are reflected from an object and received through two receiving channels vertically spaced by D, and the phases or magnitudes of the signals received through the receiving channels may be changed due to the vertical spacing of the receiving channels.

That is, depending on the height of an object, the traveling paths (traveling distances etc.) of signals traveling to the first receiving channel and the second receiving channel become different, and the phases or magnitudes of the signals received through the receiving channels become different in phase or magnitude due to the differences.

Accordingly, the processor 130 of the radar apparatus can obtain elevation information such the height etc. of the object by analyzing the differences in phase or magnitude of the signals received through the receiving channels.

When there is a little difference in phase of magnitude of the signals received through two receiving channels, it is possible to determine that the height of the object is about the center of the two receiving channels, and when the intensity of the signal received through the first receiving channel elongated in the vertically up-direction (first direction) is larger than the intensity of the signal received through the second receiving channel elongated in the vertically down-direction (second direction) and the phase difference is a predetermined level or more, it is possible to determine that the height of the object is large.

Obviously, in the first embodiment, the first transmitting antenna TX1 is not necessarily used as in FIG. 7, one of a second transmitting antenna TX2 and a third transmitting antenna TX3 included in the second transmitting antenna group may be used as a transmitting channel, and both of the second transmitting antenna TX2 and the third transmitting antenna TX3 may be used as one transmitting channel.

Further, even at the receiving end, the first receiving antenna RX1 does not necessarily need to form the first receiving channel as in FIG. 7, and a second receiving antenna RX2 vertically spaced from the second receiving antenna group forming the second receiving channel may constitute the first receiving channel.

As described above, in the signal transmission/reception method according to the first embodiment for obtaining elevation information, it is possible to precisely obtain elevation information such as the height of an object, using one channel of transmitting antenna and two or more vertically spaced receiving channels.

FIG. 8 shows a second embodiment of sensing elevation information using a radar apparatus, in which two transmitting channels and two vertically spaced receiving channels are used.

Similar to FIG. 7, FIG. 8 shows only transmitting and receiving antennas that are actually used in the transmitting and receiving antennas shown in FIG. 3 etc. to obtain elevation information by the second embodiment.

As shown in FIG. 8, in the second embodiment for obtaining elevation information, a transmission signal is transmitted through all of three transmitting channels, and two vertically spaced receiving channels can be used.

For example, as shown in FIG. 8, all of a first transmitting antenna TX1, a second transmitting antenna TX2, and a third transmitting antenna TX3 simultaneously transmit signals, and at the receiving end, signals received through a first receiving antenna RX1 included in a first receiving antenna group and two receiving antennas RX3 and RX4 included in a second receiving antenna group vertically spaced by D from the first receiving antenna RX1 are used.

The first receiving antenna RX1 constitutes one first receiving channel and the third receiving antenna RX3 and the fourth receiving antenna RX4 included in the second receiving antenna group can be combined and used as one second receiving channel.

Similarly, in the embodiment of FIG. 8, the processor 130 of the radar apparatus can obtain elevation information such the height etc. of the object by analyzing the differences in phase or magnitude of the signals received through the receiving channels.

That is, according to the second embodiment, the configuration of the receiving end is the same as that in the first embodiment, but it is different from the first embodiment that three transmitting channels are all used only at the transmitting end.

As described above, using all of three transmitting channels makes it possible to vertically form a sharp beam, so although the sensing range is slightly reduced, it is possible to improve precision in obtaining elevation information.

Obviously, similar to the first embodiment, in the second embodiment, the first receiving antenna RX1 does not necessarily form the first receiving channel and a second receiving antenna RX2 vertically spaced from the second receiving antenna group may form the first receiving channel.

As described above, in the signal transmission/reception method according to the second embodiment for obtaining elevation information, it is possible to precisely obtain elevation information such as the height of an object, using three channels of transmitting antennas and two or more vertically spaced receiving channels.

FIG. 9 shows a third embodiment of sensing elevation information using a radar apparatus, in which two vertically spaced transmitting channels transmit time-divisionally or code-divisionally a signal and one or more common receiving channels are used.

Similar to FIGS. 7 and 8, FIG. 9 shows only transmitting and receiving antennas that are actually used in the transmitting and receiving antennas shown in FIG. 3 etc. to obtain elevation information by the third embodiment.

As in FIG. 9, in the third embodiment for obtaining elevation information, two vertically spaced transmitting channels of three transmitting channels transmit signals time-divisionally or code-divisionally and elevation information can be obtained using signals received through one or more common receiving channels.

For example, as in FIG. 9, in a transmission mode, a first transmitting antenna TX1 of three transmitting channels constitutes a first transmitting channel, and a bundle of a second transmitting antenna TX2 and a third transmitting antenna TX3 included in a second transmitting antenna group spaced from the first transmission channel by the vertical distance D is used as one second transmitting channel.

Signals can be transmitted time-divisionally or code-divisionally through the first transmitting channel and the second transmitting channel.

Meanwhile, at the receiving end, as shown in (1), (2), and (3) of FIG. 9, one or more receiving antennas may be used as one common receiving channel.

For example, as in (1) of FIG. 9, only one of a third receiving antenna RX3 and a fourth receiving antenna RX4 included in a second receiving antenna group may be used as a receiving channel, as in (2) of FIG. 9, the third receiving antenna RX3 and the fourth receiving antenna RX4 included in the second receiving antenna group may be used as two receiving channels, or as in (3) of FIG. 9, only one of a first receiving antenna RX1 and a second receiving antenna RX2 included in a first receiving antenna group may be used as a receiving channel.

In the third embodiment, transmission signals that are separately transmitted by time-division etc. through two transmitting channels are vertically spaced, so there is a phase or magnitude difference even in a reception signal reflected from a specific object and received through one receiving channel and elevation information of the object can be obtained by analyzing the phase difference or the magnitude difference.

Obviously, in the third embodiment, only one receiving channel can necessarily be used at the receiving end and signals received through two or more receiving channels may be simultaneously used.

That is, in the third embodiment, it is possible to improve prevision in analysis of reception signals by averaging the signals received through two or more receiving channels and it is also possible to check whether the receiving antennas are normally operated by comparing signals received through two or more receiving channels.

For example, when the difference between the reception signal of any one channel and the reception signals of the other receiving channels is large as a result of comparing signals received through three receiving channels at the receiving end with the transmitting end remained, it is determined that the receiving antenna of the receiving channel is in a abnormal state.

Further, when the difference among signals received through three receiving channels at the receiving end with the transmitting end remained is not larger than a critical value, it may be possible to improve precision of elevation information by averaging and analyzing the phases or the magnitudes of the signals received through a plurality of channels.

As described above, when the radar apparatus according to this embodiment is used, by having the antenna arrangement shown in FIG. 3 or 4 and using the methods of transmitting and receiving signals as in FIGS. 7 to 9, it is possible not only to obtain elevation information of an object, but to measure azimuth information of the object with high resolution in both of the mid/long-range sensing mode and the short-range sensing mode.

Accordingly, it is possible to precisely measure elevation and azimuth information of an object at a mid/long distance and a short distance even without physically changing the radar apparatus or adding other devices, so it is possible to maximize the usability of the radar apparatus as an automotive radar.

On the other hand, an example of a method of obtaining elevation/azimuth information of an object, using the radar apparatus 100 according to an embodiment is described hereafter.

Figure 10:
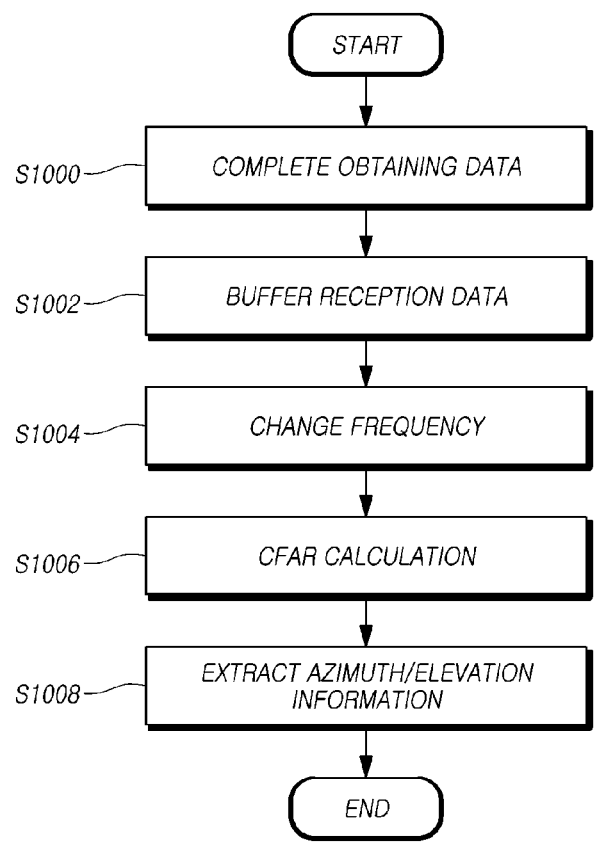
FIG. 10 is a flowchart illustrating a signal processing method provided by the radar apparatus according to an embodiment of the present disclosure.

FIG. 10 is a flowchart showing a signal processing method provided by the radar apparatus according to an embodiment.

FIG. 10 is a flowchart showing signal processing after signals are received by the signal transmission/reception method described above with reference to FIGS. 5 to 9. The method data-buffers reception data obtained in step S1000 into a unit sample size that can be processed for one cycle (S1002) and then performs frequency change (S1004).

Thereafter, the method performs CFAR (Constant False Alarm Rate) calculation on the basis of the frequency-changed reception data (S1006) and extract elevation/azimuth information, speed information, and distance information of a target (S1008). The frequency change in step S1006 may use Fourier transform such as FFT (Fast Fourier Transform).

Figure 11:
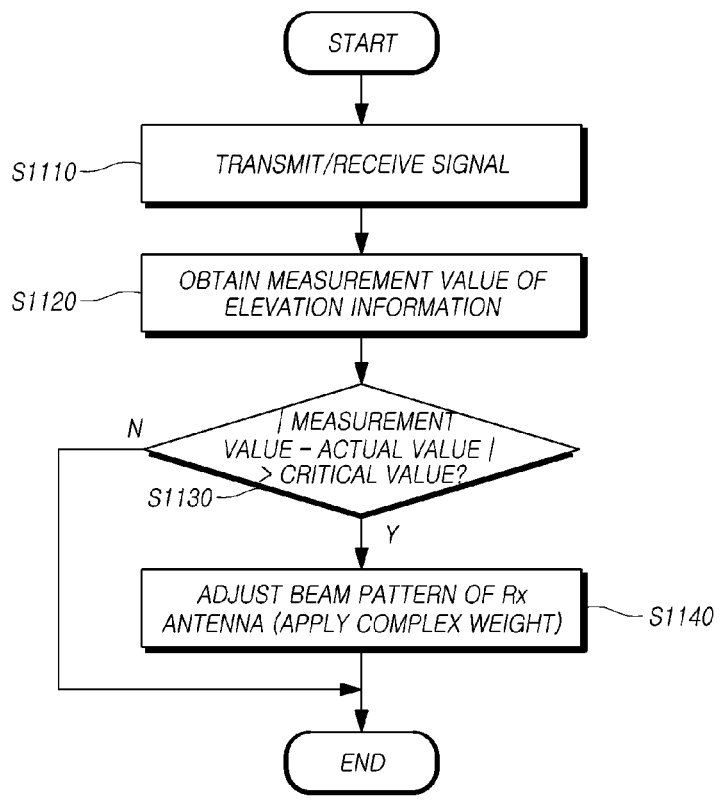
FIG. 11 is a flowchart illustrating a method of correcting a radar mounting position according to an embodiment of the present disclosure.

FIG. 11 is a flowchart illustrating a method of correcting a radar mounting position according to an embodiment.

The method of correcting a radar mounting position according to an embodiment is performed by the radar apparatus having the MINO antenna system and the signal processing method described above, particularly, performed by the error corrector 150 included in the radar apparatus.

Referring to FIG. 11, the method of correcting an error of a radar apparatus according to this embodiment largely includes: transmitting/receiving signals (S1110); obtaining measurement values of elevation information such as the height or angle of an error correction target (S1120); checking a vertical mounting error (S1130); and correcting a mounting error by correcting a beam-forming direction of a receiving antenna set (S1140).

The transmitting/receiving of signals (S1110), which is performed by the transceiver 120 of FIG. 2, is a process of transmitting a transmission signal through a transmitting antenna set and receiving a reflection signal reflected from the error correction target through the receiving antenna set. The obtaining of measurement values (S1120) is a process of calculating measurement values of elevation information of the error correction target.

The transmitting/receiving of signals (S1110) and obtaining of measurement values (S1120) are processes of transmitting and receiving signals for measuring elevation information of an error correction target and processing corresponding reception signals, thereby obtaining the elevation information of the target, which may use the configurations of the first embodiment to the third embodiment of a signal processing process and signal transmission/reception method for obtaining elevation information of an object described above.

Next, according to the second embodiment, in the transmitting/receiving of signals (S1110) and obtaining of measurement values (S1120), it is possible to transmit transmission signals using all of three transmitting channels and to use two vertically spaced receiving channels, as the second embodiment (FIG. 8).

That is, as in FIG. 8, all of a first transmitting antenna TX1, a second transmitting antenna TX2, and a third transmitting antenna TX3 simultaneously transmit signals, and at the receiving end, signals received through a first receiving antenna RX1 included in a first receiving antenna group and two receiving antennas RX3 and RX4 included in a second receiving antenna group vertically spaced by D from the first receiving antenna RX1 are used, whereby it is possible to obtain measurement values of elevation information of a target.

Next, according to a third embodiment, two vertically spaced transmitting channels of three transmitting channels transmit signals time-divisionally or code-divisionally and elevation information can be obtained using signals received through one or more common receiving channels.

In detail, as described with reference to FIG. 9, in the transmitting/receiving of signals (S1110), the transmitting antennas included in a first transmitting antenna group and the transmitting antennas included in a second transmitting antenna group transmit transmission signals time-divisionally or code-divisionally, and in the obtaining of measurement values (S1120), elevation information of the target can be obtained on the basis of reflection signals received through any one of the receiving antennas included in a first receiving antenna group and a second receiving antenna group.

In this embodiment, the error correction target includes all kinds of objects that are spaced at a predetermined distance from the radar apparatus and of which the elevation information such as height have been known.

The target may include not only a test object that is provided for a test in the process of mounting the radar apparatus, but all kinds of objects such as guard rail, a sign, and a forward vehicle of which the actual elevation information such as height has been known.

That is, the target includes all kinds of object of which the actual heights are fixed.

Further, the elevation information of a target is a concept including the height and a vertical angle of the target.

When measurement values of the elevation information such as the height of an error correction target are obtained by the first embodiment to the third embodiment, the error corrector performs the checking of a vertical mounting error (S1130) that checks a vertical mounting error of the radar apparatus.

The checking of a vertical mounting error (S1130) calculates differences between the measurement values of the elevation information of the error correction target obtained by the processor and the actual elevation information of the target that have been known, and checks a vertical mounting error on the basis of the differences.

For example, when the elevation information of a vertical angle and the difference is a predetermined critical angle or more, it is possible to determine that the radar apparatus has been vertically abnormally mounted.

Figure 12A:
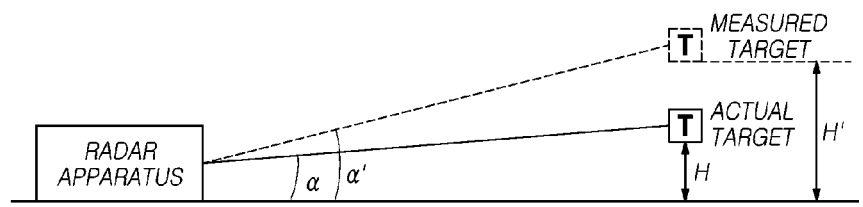
FIGS. 12A and 12B are views illustrating a principle of correcting a radar mounting position by changing beam-forming by a receiving antenna according to the embodiment.
Figure 12B:
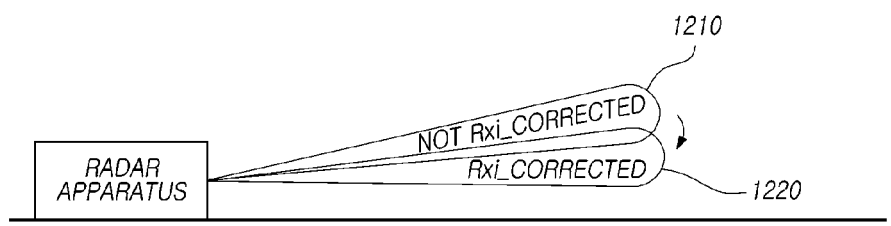

FIGS. 12A and 12B are views illustrating a principle of correcting a radar mounting position by changing beam-forming by a receiving antenna according to the embodiment.

It is assumed that, as in FIG. 12a, the actual height of a target is H and the angle between the path from the radar apparatus to the target and the horizon is α.

If the radar apparatus has been normally mounted, as described above, the elevation information of a target measured by the processor, that is, height and angular information should be the same as H and α.

However, as shown in FIG. 12a, when the radar apparatus has been abnormally mounted higher than a normal position or has been moved in the process of use, the height H' and angular information α' of the elevation information of the target obtained by the processor would be smaller than the actual height H and angular information α of the target.

Accordingly, the error corrector 150 calculates differences between the measurement value (H' or α') of the elevation information of the error correction target obtained by the processor and the actual elevation information (H and α) of the target that has been known, and checks a vertical mounting error of the radar apparatus on the basis of the difference.

Next, the error corrector 150, in the correcting of a mounting error (S1140), corrects a mounting error by adjusting the beam-forming direction of a receiving antenna set, depending on the magnitude of the error, that is, the magnitude and direction of the difference.

In detail, the error corrector performs digital beam-forming that changes the directions of reception beams of receiving antennas included in the receiving antennas set by assigning a peculiar complex weight to the receiving antennas in accordance with the difference, and error correction using digital beam-forming will be described below with reference to FIG. 13.

That is, as shown in FIG. 12b, when the radar apparatus has been abnormally mounted higher than the normal position, the error corrector multiples the receiving antennas by a complex weight to move down the original beam pattern 1210 of the receiving antennas.

Accordingly, the corrected beam pattern 1220 of the receiving antennas direct down under the initial reception beam pattern 1210, so it is possible to correct the vertical sensing performance of the radar apparatus even without physically adjusting the radar apparatus up or down.

As described above, by adjusting the reception beam pattern of the receiving antennas in accordance with the difference between the measurement values of the elevation information of the error correction target obtained by the processor and the actual elevation information values of the target, the vertical sensing performance of the radar apparatus can be secured even without physically adjusting the radar apparatus up and down.

Figure 13:
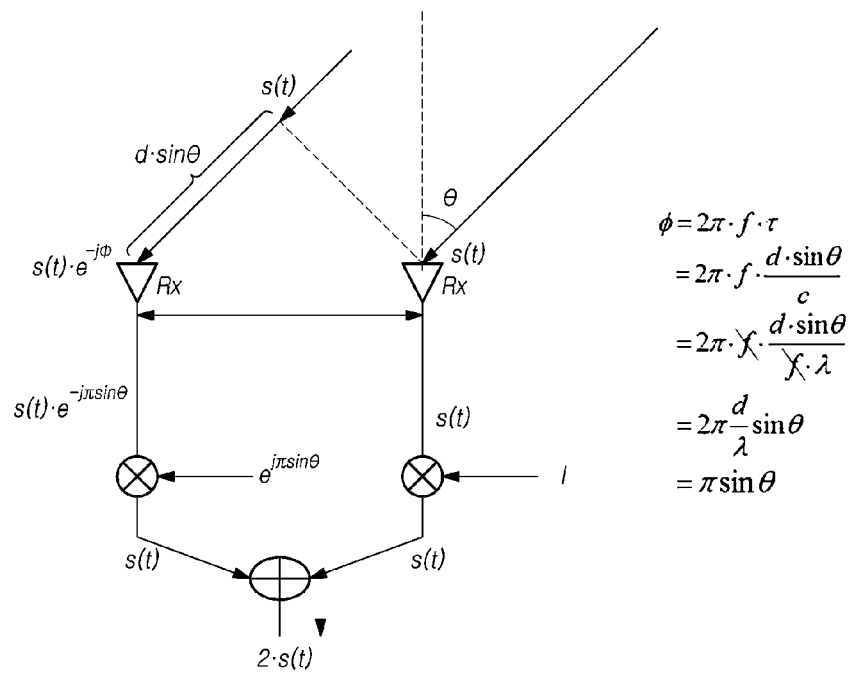
FIG. 13 is a view illustrating a method of changing a scanning angle of the radar apparatus into a normal scanning angle using digital beam-forming by a receiving antenna according to an embodiment of the present disclosure.

FIG. 13 is a view illustrating a method of correcting a scanning angle of a radar apparatus, that is, the direction of a reception beam pattern of receiving antennas using digital beam-forming of the receiving antennas according to an embodiment.

As shown in FIG. 13, it is possible to measure an error in mounting angle and change an electric scanning angle of the radar apparatus, that is, the direction of the beam pattern of receiving antennas into a normal range.

That is, the angle of the beam pattern of receiving antennas or the electric scanning angle can be corrected, as shown in FIG. 13, by a method that radiating a beam to correspond to the result of multiplying a signal vector S or a steering vector a by a correction angle in the basic concept of digital beam-forming. The correction angle may be a complex number and can be defined as the complex weight to be applied to receiving antennas.

That is, when a radar beam is physically turned, an error in the mounting angle of the radar apparatus on a vehicle can be corrected by steering the radar beam as much as the turned angle.

In detail, as described above when the difference between the measurement values of the elevation information of the error correction target obtained by the processor is calculated, the correction angle of the beam pattern of the receiving antennas is determined on the basis of the difference, and accordingly, a complex weight to be applied to the receiving antennas is selected.

An equation for changing a beam pattern angle of receiving antennas using digital beam-forming according to an embodiment is described below.

Equation 2 is related to a spatial correlation matrix and Equation 2 is related to a steering vector.

In the equations, R is a relative distance between the radar apparatus and a target, θ is a relative angle between the radar apparatus and the target, S is a signal vector for electric scanning for correcting an error angle, and a is a steering vector for electric scanning for correcting the error angle.

$$R = \frac{1}{N} \sum_{k=1}^{N} [s(k)s^H(k)] \quad \text{[Equation 2]}$$

$$s(k) = [s_{ch1}(k)s_{ch2}(k)s_{ch3}(k)s_{ch4}(k)]^H \quad \text{[Equation 2]}$$

$$a(\theta) = \left[1 e^{j\left(2\pi\frac{d}{\lambda}\sin(\theta)\right)} e^{j\left(2\pi\frac{2d}{\lambda}\sin(\theta)\right)} e^{j\left(2\pi\frac{3d}{\lambda}\sin(\theta)\right)}\right]^H \quad \text{[Equation 3]}$$

That is, on the basis of the difference between the measurement values of the elevation information of the error correction target obtained by the processor, the signal vector S(k) (or the steering vector a(θ)) for correcting an error defined in Equations 2 and 3 is determined as complex weights and the complex weights are applied to the receiving antennas, thereby adjusting the direction of the reception beam pattern of the receiving antennas.

For example, when the difference between the actual angular information of the target α and the actually measure angular information α' is 3 degrees in FIG. 12b, a signal vector S(k) (or the steering vector a(θ)) corresponding to the angular difference is calculated and is multiplied to reception signals of the receiving antennas, thereby changing the reception direction of the receiving antennas.

According to the embodiments described above, a first transmitting antenna group and a first receiving antenna group are constituted by elongating some of a plurality of transmitting antennas and a plurality of receiving antennas in a first direction of vertical directions, a second transmitting antenna group and a second receiving antenna group are constituted by elongating the other antennas in a second direction opposite to the first direction, and one or more of transmitting antennas that transmit transmission signals and one or more of receiving antennas that receive reflection signals are included in different groups, thereby being able to precisely sense elevation information of an object.

Further, by checking a vertical mounting error of the radar apparatus on the basis of e difference between the measurement values of the elevation information of the error correction target obtained by the processor and by adjusting the directions of reception beams of receiving antennas on the basis of the difference, it is possible to secure the vertical sensing performance of the radar apparatus even without physically adjusting the radar apparatus up or down.

Therefore, by using the embodiments, it is possible to precisely measure elevation and azimuth information of an object in both of a mid/long-range and short-range sensing modes required for automotive radars even without physically changing a radar apparatus or adding other device. Further, even if there is a vertical mounting error in a radar apparatus, it is possible to appropriately compensate for the error.

Even though all components of embodiments of the present disclosure were described as being combined in a single part or being operated in cooperation with each other, the present disclosure is not limited thereto. That is, all the components may be selectively combined one or more parts and operated if it is within the object of the present disclosure. Further, all of the components may be implemented by one independent hardware, respectively, but some or all of the components may be selectively combined and implemented by computer programs having a program module that performs some or all of functions combined by one or more pieces of hardware. Codes or code segments constituting the computer programs may be easily inferred by those skilled in the art. The computer programs are stored in computer-readable media and read and executed by a computer, whereby embodiments of the present disclosure can be achieved. A magnetic storing medium, an optical recording medium, and a carrier wave medium may be included in the recording media of computer programs.

Further, terms 'include', 'constitute', 'have' etc. stated herein means that corresponding components may be included, unless specifically stated, so they should be construed as being able to further include other components rather than excepting other components. Unless defined otherwise, all the terms used in the specification including technical and scientific terms have the same meaning as those that are understood by those skilled in the art. The terms generally used such as those defined in dictionaries should be construed as being the dame as the meanings in the context of the related art and should not be construed as being ideal or excessively formal meanings, unless defined in the present disclosure.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A radar apparatus, comprising:
    a transmitting antenna set configured to include: a first transmitting antenna group including a first transmitting antenna elongated in a first direction of vertical directions; and a second transmitting antenna group including a second transmitting antenna and a third transmitting antenna that are elongated in a second direction opposite to the first direction and spaced from the first transmitting antenna by a first vertical distance;
    a receiving antenna set configured to include: a first receiving antenna group including a first receiving antenna and a second receiving antenna that are elongated in the first direction; and a second receiving antenna group including a third receiving antenna and a fourth receiving antenna that are elongated in the second direction and spaced from the first receiving antenna group by a second vertical distance;
    a transceiver configured to transmit transmission signals through the transmitting antenna set and receive reflection signals reflected from an error correction target through the receiving antenna set;
    a processor configured to obtain elevation information of the target on the basis of the reflection signals received by the receiving antenna set; and
    an error corrector configured to calculate a difference between measurement values of the elevation information of the target obtained by the processor and actual elevation information of the target, and change the direction of beam-forming of the receiving antennas included in the receiving antenna set in accordance with the difference.

2. The radar apparatus of claim 1, wherein the transceiver transmits transmission signals through one or more of the first transmitting antenna group and the second transmitting antenna group, and receives reflection signals reflected from the error correction target through the receiving antenna set, and
    the processor obtains elevation information of the target on the basis of the reflection signal received through one receiving antenna included in the first receiving antenna group and reflection signals received through one or more receiving antennas included in the second receiving antenna group.

3. The radar apparatus of claim 1, wherein the transceiver transmits transmission time-divided or code-divided transmission signals through the transmitting antenna included in the first transmitting antenna group and the transmitting antennas included in the second transmitting antenna group, and receives reflection signals reflected from the target through the receiving antenna set, and
    the processor obtains elevation information of the target on the basis of reflection signals received through one or more of the receiving antennas included in the first receiving antenna group and the second receiving antenna group.

4. The radar apparatus of claim 1, wherein the error corrector performs digital beam-forming for changing the directions of reception beams of the receiving antennas included in the receiving antenna set by assigning a peculiar complex weight to the receiving antennas in accordance with the difference.

5. The radar apparatus of claim 1, wherein, in a mid/long-range sensing mode for obtaining azimuth information of the target, the transceiver transmits transmission time-divided or code-divided transmission signals through the transmitting antenna included in the first transmitting antenna group and the transmitting antennas included in the second transmitting antenna group, and receives reflection signals reflected from the target through the receiving antenna set, and
    the processor obtains azimuth information of the target on the basis of reflection signals received through all of the receiving antennas included in the first receiving antenna group and the second receiving antenna group.

6. The radar apparatus of claim 5, wherein, in a short-range sensing mode for obtaining azimuth information of the target, the transceiver transmits transmission signals time-divided or code-divided through the second transmitting antenna and the third transmitting antenna, and receives reflection signals reflected from the target through the receiving antenna set, and
    the processor obtains horizontal azimuth of the target on the basis of reflection signals received through the third receiving antenna and the fourth receiving antenna.

7. The radar apparatus of claim 6, further comprising:
    a virtual RX antenna creator configured to create one or more virtual RX antenna among first to fourth receiving antennas in the mid/long-range sensing mode, and create one or more virtual RX antennas at sides of the third receiving antenna and the fourth receiving antenna in the short-range sensing mode.

8. The radar apparatus of claim 7, wherein the third receiving antenna and the fourth receiving antenna each include k array antennas, the second transmitting antenna, the third transmitting antenna, the first receiving antenna, and the second receiving antenna each include 2k array antennas, and the first transmitting antenna includes 4k array antennas.

9. The radar apparatus of claim 8, wherein a horizontal distance between the second transmitting antenna and the third transmitting antenna is two times a horizontal distance B between the third receiving antenna and the fourth receiving antenna.

10. The radar apparatus of claim 9, wherein when a horizontal distance among the first receiving antenna, the first transmitting antenna, and the second transmitting antenna group is A, the first receiving antenna and the second receiving antenna are spaced by a horizontal distance 2A respectively left and right from the second receiving antenna group.

11. The radar apparatus of claim 10, wherein the horizontal distance A among the first receiving antenna, the first transmitting antenna, and the second transmitting antenna group is two-time larger than the horizontal distance B between the third receiving antenna and the fourth receiving antenna.

12. A method of correcting an error of a radar apparatus that includes:
an antenna system configured to include: a transmitting antenna set including a first transmitting antenna group including a first transmitting antenna elongated in a first direction of vertical directions, and a second transmitting antenna group including a second transmitting antenna and a third transmitting antenna that are elongated in a second direction opposite to the first direction and spaced from the first transmitting antenna by a first vertical distance; and a receiving antenna set including a first receiving antenna group including a first receiving antenna and a second receiving antenna that are elongated in the first direction, and a second receiving antenna group including a third receiving antenna and a fourth receiving antenna that are elongated in the second direction and spaced from the first receiving antenna group by a second vertical distance;
a transceiver;
a processor; and
an error corrector,
the method comprising:
checking a vertical mounting error on the basis of a difference between measurement values of the elevation information of the target obtained by the processor and actual elevation information of the target; and
correcting an error by adjusting beam-forming directions of the receiving antennas included in the receiving antenna set in accordance with the difference.

13. The method of claim 12, wherein correcting of an error performs digital beam-forming for changing the directions of reception beams of the receiving antennas included in the receiving antenna set by assigning a peculiar complex weight to the receiving antennas in accordance with the difference.

14. The method of claim 13, further comprising: before the checking of an error,
transmitting transmission signals through the transmitting antenna set and receiving reflection signals reflected from the error correction target through the receiving antenna set, by means of the transceiver; and
obtaining measurement values of elevation information of the target on the basis of the reflection signals reflected from the receiving antenna set, by means of the processor.

15. The method of claim 14, wherein the transmitting and receiving of signals transmits transmission signals through one or more of the first transmitting antenna group and the second transmitting antenna group, and receives reflection signals reflected from the error correction target through the receiving antenna set, and
the obtaining of measurement values obtains elevation information of the target on the basis of the reflection signal received through one receiving antenna included in the first receiving antenna group and reflection signals received through one or more receiving antennas included in the second receiving antenna group.

16. The method of claim 14, wherein the transmitting and receiving of signals transmits transmission time-divided or code-divided transmission signals through the transmitting antenna included in the first transmitting antenna group and the transmitting antennas included in the second transmitting antenna group, and receives reflection signals reflected from the target through the receiving antenna set, and
the obtaining of measurement values obtains elevation information of the target on the basis of reflection signals received through one or more of the receiving antennas included in the first receiving antenna group and the second receiving antenna group.

17. A radar apparatus comprising:
a transmitting antenna set configured to include a first transmitting antenna group and a second transmitting antenna group that are vertically spaced by a first vertical distance and elongated in opposite directions;
a receiving antenna set configured to include a first receiving antenna group and a second receiving antenna group that are vertically spaced by a second vertical distance and elongated in opposite directions;
a transceiver configured to transmit transmission signals through the transmitting antenna set and receive reflection signals reflected from an error correction target through the receiving antenna set;
a processor configured to obtain elevation information of the target on the basis of the reflection signals received through the receiving antenna set; and
an error corrector configured to calculate a difference between measurement values of the elevation information of the target obtained by the processor and actual elevation information of the target, and change the direction of beam-forming of receiving antennas included in the receiving antenna set in accordance with the difference.

* * * * *